United States Patent
Johansson

(10) Patent No.: US 11,846,122 B2
(45) Date of Patent: Dec. 19, 2023

(54) LIFT HANDLE ARRANGEMENT

(71) Applicant: Industrilås i Nässjö Aktiebolag, Nässjö (SE)

(72) Inventor: Daniel Johansson, Eksjö (SE)

(73) Assignee: Industrilås i Nässjö Aktiebolag, Nässjö (SE)

( * ) Notice: Subject to any disclaimer, the term of this patent is extended or adjusted under 35 U.S.C. 154(b) by 361 days.

(21) Appl. No.: 17/047,275

(22) PCT Filed: May 6, 2019

(86) PCT No.: PCT/EP2019/061549
§ 371 (c)(1),
(2) Date: Oct. 13, 2020

(87) PCT Pub. No.: WO2019/219431
PCT Pub. Date: Nov. 21, 2019

(65) Prior Publication Data
US 2021/0164260 A1 Jun. 3, 2021

(30) Foreign Application Priority Data
May 16, 2018 (EP) .................................. 18172631

(51) Int. Cl.
*E05B 5/00* (2006.01)
*E05B 7/00* (2006.01)
(Continued)

(52) U.S. Cl.
CPC ............... *E05B 5/006* (2013.01); *E05B 7/00* (2013.01); *F16H 19/04* (2013.01); *E05B 13/002* (2013.01); *Y10S 292/31* (2013.01); *Y10T 292/57* (2015.04)

(58) Field of Classification Search
CPC .. Y10T 292/57; Y10T 292/11; Y10T 70/5761; Y10T 70/5792; Y10T 70/8541;
(Continued)

(56) References Cited

U.S. PATENT DOCUMENTS 2,427,386 A * 9/1947 Claud-Mantle ......... E05B 85/22
292/DIG. 31
4,616,864 A * 10/1986 Douglas .................. E05C 9/046
292/336.3
(Continued)

FOREIGN PATENT DOCUMENTS

DE 19801721 C1 4/1999
DE 10246441 A1 4/2004
(Continued)

OTHER PUBLICATIONS

International Search Report and Written Opinion for International Application No. PCT/EP2019/061549, dated Jul. 4, 2019 (13 pages).
(Continued)

*Primary Examiner* — Christine M Mills
*Assistant Examiner* — Faria F Ahmad
(74) *Attorney, Agent, or Firm* — Kagan Binder, PLLC

(57) ABSTRACT

The present disclosure presents a handle arrangement and a use for said handle arrangement. Said handle arrangement comprises a housing, a handle comprising a handle grip and a coupling portion, the handle rotatable relative to the housing around a first axis, and a gear, the gear rotatable relative to said housing 5 around a second axis, the handle arrangement further comprising a motion converter comprising a gear rack arranged adjacently to the gear, the motion converter gear rack being linearly moveable relative the gear along a third axis and comprises cut teeth configured to engage with corresponding cogs of the gear, wherein the motion converter is coupled to the handle such that a
(Continued)

rotation of the handle around the first 10 axis causes the motion converter gear rack to move along the third axis causing the gear to rotate around the second axis.

13 Claims, 13 Drawing Sheets

(51) Int. Cl.
 *F16H 19/04* (2006.01)
 *E05B 13/00* (2006.01)
(58) Field of Classification Search
 CPC ......... Y10T 292/0843; Y10T 292/1018; Y10T 16/473; Y10T 16/458; Y10S 292/30; Y10S 292/31; E05B 13/002; E05B 7/00; E05B 1/0092; E05B 63/04; E05B 5/003; E05B 63/0065; E05B 5/006; E05C 9/041; E05C 9/021; E05C 1/145; E05C 9/12; F16H 19/04
 See application file for complete search history.

(56) References Cited

U.S. PATENT DOCUMENTS

| | | | | | |
|---|---|---|---|---|---|
| 4,631,937 | A | * | 12/1986 | Debus | E05B 13/002 292/DIG. 31 |
| 4,930,325 | A | * | 6/1990 | Ramsauer | E05C 3/042 292/DIG. 68 |
| 5,301,989 | A | * | 4/1994 | Dallmann | E05B 65/0876 292/DIG. 31 |
| 5,450,735 | A | * | 9/1995 | Esaki | E05C 3/042 292/DIG. 31 |
| 5,482,334 | A | * | 1/1996 | Hotzl | E05B 53/00 292/357 |
| 5,638,709 | A | * | 6/1997 | Clavin | E05C 3/048 292/DIG. 31 |
| 5,873,274 | A | * | 2/1999 | Sauerland | E05B 13/002 70/462 |
| 6,039,363 | A | * | 3/2000 | Sugimura | E05C 3/04 292/DIG. 31 |
| 6,182,483 | B1 | * | 2/2001 | von Kathen | E05B 7/00 292/336.3 |
| 6,363,761 | B1 | * | 4/2002 | Sauerland | E05C 9/041 70/462 |
| 7,159,909 | B1 | * | 1/2007 | Hung | E05B 1/0092 292/DIG. 31 |
| 7,584,634 | B2 | * | 9/2009 | Hoffman | E05C 9/041 292/336.3 |
| 7,958,603 | B2 | * | 6/2011 | Franco | E05B 1/0092 292/202 |
| 9,890,556 | B2 | * | 2/2018 | Fink | E05B 13/10 |
| 11,591,821 | B2 | * | 2/2023 | Olkay | E05B 9/084 |
| 2003/0024285 | A1 | * | 2/2003 | Segawa | E05B 13/103 70/208 |
| 2011/0254658 | A1 | | 10/2011 | Hui | |
| 2012/0049544 | A1 | * | 3/2012 | Kwon | E05B 85/107 292/336.3 |
| 2014/0367976 | A1 | * | 12/2014 | Kshirsagar | A62B 25/005 292/336.3 |
| 2019/0234120 | A1 | * | 8/2019 | Flaute | E05B 83/30 |
| 2020/0071973 | A1 | * | 3/2020 | Han | E05B 85/107 |

FOREIGN PATENT DOCUMENTS

| | | |
|---|---|---|
| EP | 2733286 A2 | 5/2014 |
| FR | 3022938 A1 | 1/2016 |
| JP | 2002371731 A | 12/2002 |
| WO | 9842938 A1 | 10/1998 |

OTHER PUBLICATIONS

E-Space English Abstract for DE19801721 C1.
E-Space English Abstract for EP 2733286 A2.
E-Space English Abstract for FR 3022938 A1.
E-Space English Abstract for JP 2002371731 A.
E-Space English Abstract for WO 9842938 A1.
E-Space English Abstract for DE 10246441 A1.

* cited by examiner

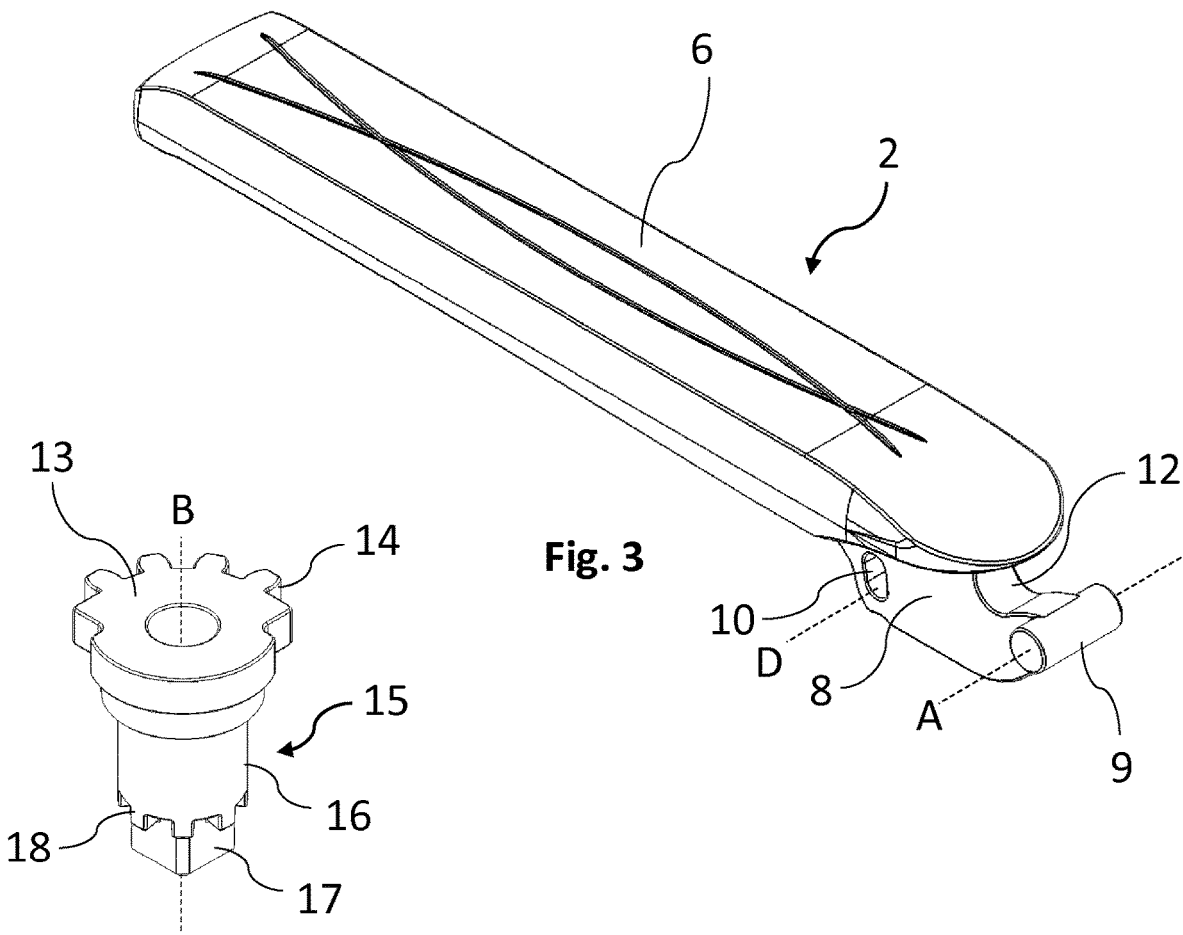
Fig. 3
Fig. 4
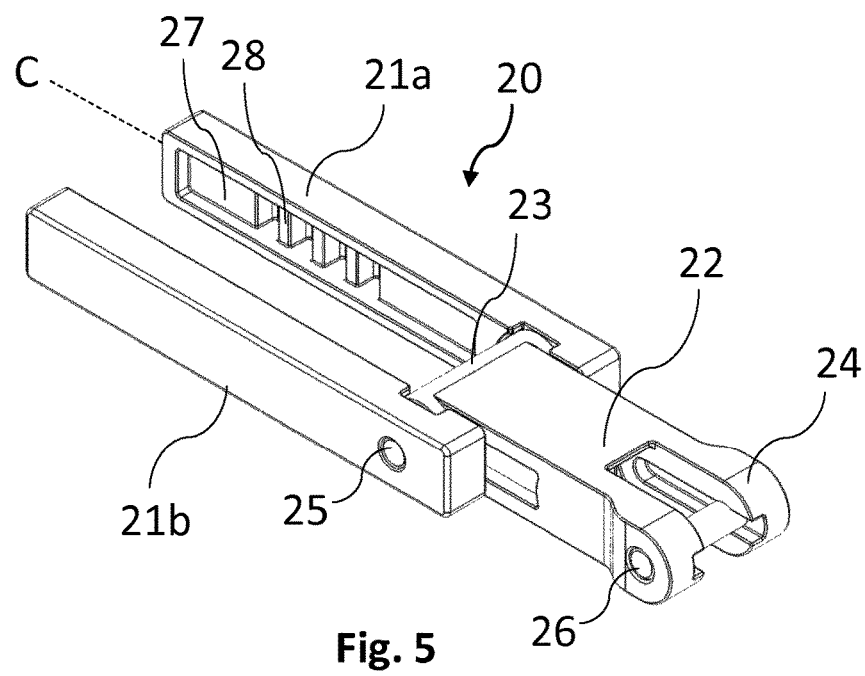
Fig. 5

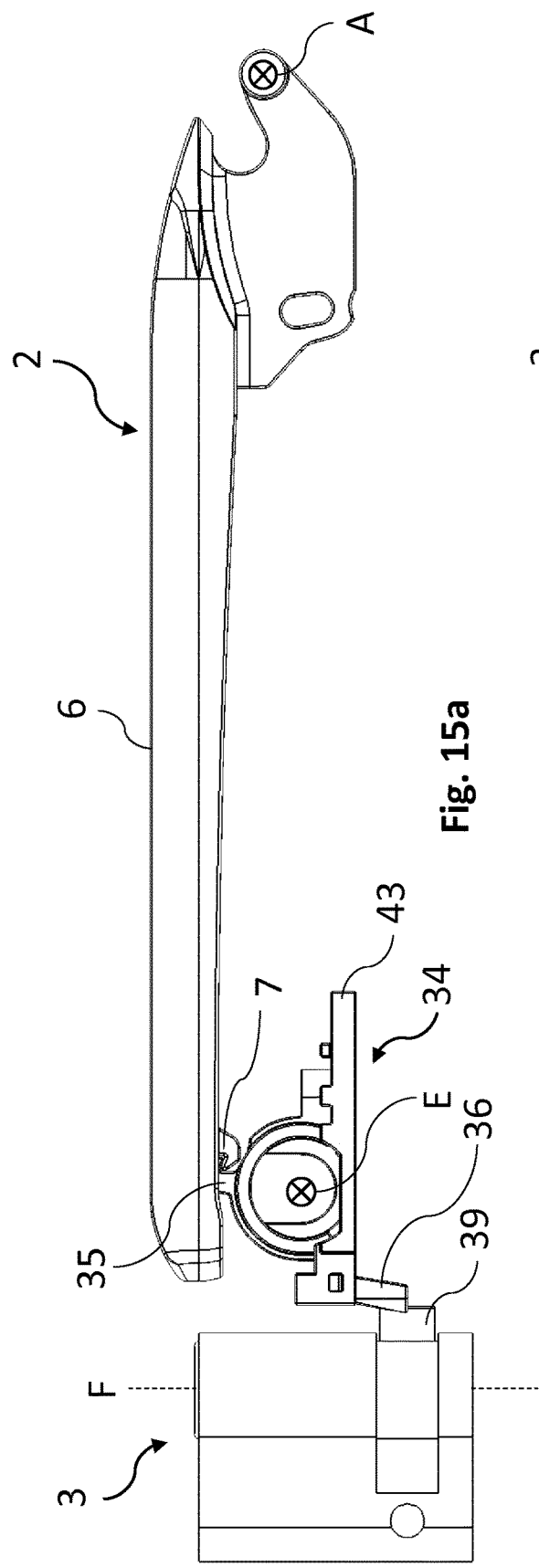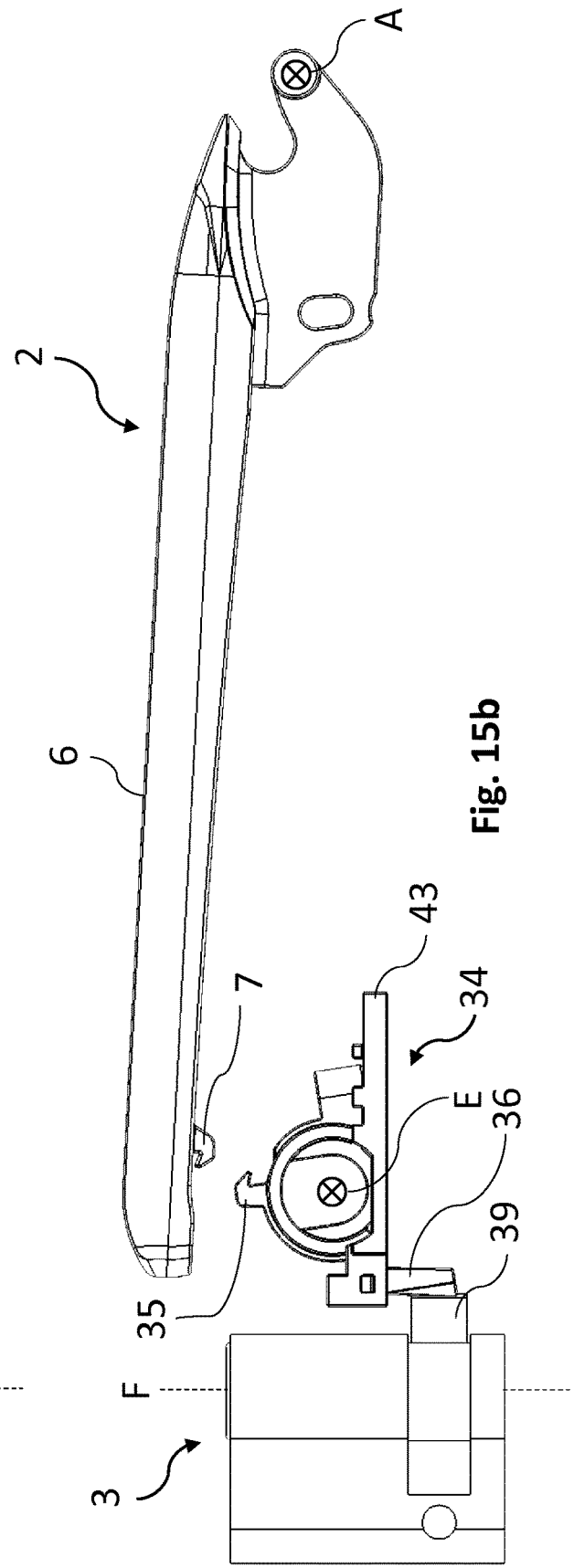

LIFT HANDLE ARRANGEMENT

CROSS-REFERENCE TO RELATED APPLICATIONS

This application claims priority to International Application No. PCT/EP2019/061549, filed May 6, 2019 and titled "LIFT HANDLE ARRANGEMENT," which in turn claims priority from a European Patent Application having Ser. No. 18/172,631.6, filed May 16, 2018, titled "LIFT HANDLE ARRANGEMENT," both of which are incorporated herein by reference in their entireties.

TECHNICAL FIELD

The present disclosure relates to a lift handle arrangement and more specifically to a compact lift handle arrangement.

BACKGROUND

There is a wide range of handle arrangements for facilitating opening of doors or windows. A particular type is known as a lift handle arrangement, see for instance EP0261266. This handle arrangement comprises a longitudinal handle pivotably coupled at one end to a connecting element such as to allow the longitudinal handle to rotate about a first axis relative the connecting element. The connecting element is rotatable around a second axis. The connecting element may be coupled to a latching member of a door or window which is securing said door or window in a closed position. By rotating the connecting element said latching member is moved between a latching position, in which the door is securely closed, and an unlatched position, in which said door is openable. In order to unsecure or secure said door or window, the lift handle must be rotated in two directions, first about the pivot axis at the connecting element, away from or toward the door or window surface, and then, rotated about the second axis such that the connecting element rotates about the second axis. Due to its design, it is a commonly used handle arrangement for facilitating opening of doors or windows.

However, this type of solution requires that the handle is rotated in two directions for unsecuring or securing said door or window. This may require a relatively large free space due to the turning radius of the handle. This poses a problem when used in a compact environment in which the longitudinal lift handle could potentially be obstructed when rotated around the second axis, thus hindering said door or window to be opened. Furthermore, the handle is configured to directly couple to the latching mechanism of said door or window.

Hence, there is a need for a lift handle arrangement that solves the problem of having a large turning radius in a compact environment, while having a structure which can withstand prolonged pressure and make efficient use of the limited space available within a handle arrangement housing.

SUMMARY OF THE PRESENT DISCLOSURE

It is an object of the present disclosure to provide an improved solution that alleviates the mentioned drawbacks with present solutions. Furthermore, it is an object to provide an improved solution for unsecuring or securing a door, wherein the solution is compact and sufficiently secure. The invention is defined by the appended independent claims, with embodiments being set forth in the appended dependent claims, in the following description and in the drawings.

According to a first aspect of the invention, a handle arrangement is provided. Said handle arrangement comprises a housing, a handle comprising a handle grip and a handle coupling portion, the handle rotatable relative to the housing around a first axis, and a gear, the gear rotatable relative to said housing around a second axis, the handle arrangement further comprising a motion converter comprising a gear rack arranged adjacently to the gear, the motion converter gear rack being linearly moveable relative the gear along a third axis and comprises cut teeth configured to engage with corresponding cogs of the gear, wherein the motion converter is coupled to the handle such that a rotation of the handle around the first axis causes the motion converter gear rack to move along the third axis causing the gear to rotate around the second axis. The motion converter is provided with a pre-biased spring configured to push an abutting element towards a recess in said handle, the recess configured to receive the abutting element such that the handle is kept in place in at least one position The handle arrangement may be arranged to any openable element. By openable element, it may refer to a door, a hatch, a gate, a window or any other kind of moveable element that covers at least a portion of an opening or a gap when said openable element is in a closed position. One boundary of the openable element may be provided with hinges for engaging with hinges located on an openable element frame. The openable element may comprise a latching means for securing the openable element in its closed position, wherein the latching means is arranged to the openable element such that it may engage in a catch means arranged in the vicinity of the opening or gap to the openable element frame. The latching means may be moved between a latching position, in which the openable element is secured, and an unlatched position, in which the openable element is unsecured and moveable. The movement of the latching means between the latching position and the unlatched position may be realized through rotation of a coupling element, for instance a shaft.

The gear may be connected to a connecting element, said connecting element configured to couple with said coupling element. The connecting element may primarily extend in a general direction, defining a longitudinal direction of extension of said connecting element. The longitudinal axis of the connecting element may be the connecting elements intended rotational axis. The gear may be connected such that its intended rotational axis, i.e. said second axis, coincides with the connecting elements intended rotational axis. The gear and the connecting element may be manufactured as two separate components. The gear and the connecting element may be manufactured as a single component. The gear and the connecting element may be fixed relative each other to constitute a single component, possibly by welding them together.

The housing may have a front side and a back side, wherein the handle is arranged along the front side of the housing when in a closed position. When the handle arrangement is arranged to an openable element, the back side is configured to face said openable element. The handle arrangement may be provided with attachment means for attaching the housing to the openable element. The attachment means may be screws configured to engage, via holes on the back side of the housing, with threaded holes in the openable element. The screws may be fixed to the openable element by screw nuts. The housing may be configured to have an opening on the back side of the housing such that the gear can be accessed by a connecting element. The housing may be arranged to the openable element so that a connecting element protrudes through said opening to be coupled to the coupling element of said openable element.

The handle grip may have a front side and a back side, wherein the back side is defined as the side facing the housing when the handle is in a closed position, and wherein the front side is defined as the handle grip side facing away from the housing when the handle is in a closed position. The handle grip may comprise a boundary connecting a front side surface to a back side surface. The boundary may be an edge. The boundary may be a distinct side surface. The boundary may be a set of distinct side surfaces. The handle coupling portion may be arranged on a back side of the handle grip. The handle coupling portion may extend into the housing when said handle is arranged and coupled to said housing. The handle coupling portion may comprise protruding portions extending out from the handle coupling portion along a first axis that is substantially perpendicular to the longitudinal axis of the handle. The protruding portions may extend symmetrically from the handle coupling portion. The protruding portions may have a circular cross-section along the first axis. The handle may be coupled to the housing via the protruding portions on the handle coupling portion such that the handle is rotatable around said first axis.

The handle arrangement may comprise a first latching mechanism for securing the handle to the housing. The first latching mechanism may comprise a latching element in the housing and a latch receiving element arranged on the handle. The latching element may comprise a latch which can be moved into a position to engage with the latch receiving element and grab the handle when said handle is in a closed position. The latch may be in the shape of a hook. The latch receiving element may be positioned on the back side of the handle grip. The latch receiving element may be positioned in the vicinity of a longitudinal end, the opposite end relative the end of the handle that is closer to the rotational coupling to the housing. The latch receiving element may be located along the boundary of the handle grip. The latch receiving element may be located at the front surface. The latch of the first latching mechanism may be moved into position by either translation, rotation or by a combination of the two.

The movement of the latch may be controlled by a locking device arranged to the handle arrangement. The housing may have a cavity for holding such a locking device securely in place. The locking device may be configured to be accessed from the front side of the housing. The locking device may be configured to be accessed by displacing a shutter on the front side of the housing. The shutter may be moveable along a longitudinal axis of the housing. The shutter may be configured to be moveable in a direction perpendicular to the longitudinal axis to the housing and may cause the unsecuring of the openable element. The disclosed handle arrangement allows for a handle to be only indirectly coupled to the coupling element of the door. In that case, any pressure applied to the handle will not damage the coupling element or latching mechanism of the door. Also, even if the handle would break due to the applied pressure, the internal mechanics of the handle arrangement may still be securely protected.

A further advantage is that the disclosed handle arrangement may be constructed using relatively few mechanical components. Hence, the risk of a failure of the handle arrangement due to prolonged use is reduced, since there are fewer components that may break. Further, due to fewer components, the quality of each component may be more definitely ensured. Furthermore, manufacturing costs may also be reduced, since fewer components for each respective handle arrangement must be produced.

A further advantage of the disclosed handle arrangement is that the housing can be provided with a compact form factor. The motion converter and the gear may be tightly secured by a compact housing. The housing may also fit a connecting element in a compact manner. The housing may be designed so as to provide protection to the motion converter and the gear, so that the motion converter and the gear may not be accessed by unauthorized personnel. Furthermore, the handle may be designed to provide further protection to the motion converter and the gear when the handle is in a closed position. The handle and the housing may be mutually designed so as to provide a complete enclosure of the motion converter and the gear when arranged to the door. Such a design offers the advantage of a substantial protection to the interior mechanical components. The design may protect the interior of the housing from undesirable substances, which may be prone to damage the mechanical components. Such substances may for instance be dirt, which can hamper the movement of the mechanical components and cause increased wear and tear, or liquids which may cause corrosion. By preventing such substances from entering the interior of the housing, the durability and life expectancy of the handle arrangement may be increased and improved.

The pre-biased spring may be arranged in a cavity in the motion converter. The abutting element may push on the handle, under influence of the pre-biased spring, so that the handle is kept at a desired position defined by the position of the recess on the handle coupling portion. For instance, the recess may be positioned on the handle coupling portion such that the handle is kept in position when fully rotated, thereby preventing any free rotation of the handle. An advantage of this is that the latching member of the openable element is hindered from being accidentally moved into a latching position prior to the openable element has been properly closed. For instance, if the openable element is heavy, the latching member would potentially have to absorb all of the kinetic energy of the door, possibly breaking the latching member. Hence, by having the handle kept in at least one engaging position, more specifically in an open position, the latching member of the door may be protected. The abutting element may, when being pushed on the handle so that the handle is moved, move along the surface of the recess on the handle. Such movement may be gliding movement along the surface of the recess on the handle. Hence, when the latching mechanism has released the handle, the pre-biased spring and the abutting element may push the handle to an intermediate position by pushing the abutting element towards the surface of the recess on the handle being shaped such that the abutting element moves along said surface towards said recess. The intermediate position of the handle may be a position between the closed position and the open position.

Furthermore, multiple recesses for engaging with the abutting element may be distributed along the handle coupling portion facing the abutting element during the handle's full range of rotational motion. Hence, multiple engaging positions may be established in which the handle is prevented from freely rotating. Further, a recess may be placed along said handle coupling portion side so that the handle is in an engaging position directly when unsecured from the housing. An advantage of this is that the latching mechanism may be omitted, wherein the handle is kept in position by the recess engaging with the abutting element when the handle is in a closed position. The handle may be disengaged from this engaging position by pressing on the handle grip. When pressed, the abutting element may be disengaged from the recess. The pre-biased spring may force the abutting element to press onto the receiving surface of the handle coupling portion, causing it to accelerate into rotation. The rotation may be sufficiently quick so that the abutting element is unable to engage with the recess, thereby passing it. Hence, the handle may be rotated into said intermediate position. To close the handle again, the handle may be pressed into its closed position such that the abutting element is allowed to engage with the recess, thereby keeping the handle in a closed position.

According to one embodiment, said first axis and said second axis are mutually perpendicular. By providing a handle arrangement where these axes are mutually perpendicular, the motion of the handle may more easily be converted as a rotation of the gear. Furthermore, by having these axes mutually perpendicular, the handle arrangement may advantageously be provided in a more compact form. A further advantage of having the first and second axis arranged mutually perpendicular is that the handle may be rotated away from or toward the openable element by a pulling force or a pushing force respectively. A user operating the handle arrangement may be more readily able to apply such a force, for instance by assuming a stance where he or she uses his or her own body weight when exerting such a force. The first axis and the second axis may be separated by a distance so as not to intersect. Long the distance between the first axis and the second axis, the motion converter may be arranged. The third axis may thereby extend between the first axis and the second axis.

According to one further embodiment, said first axis and said second axis are mutually parallel. By providing a handle arrangement where these axes are mutually parallel, the motion of the handle may more easily be converted as a rotation of the gear. Furthermore, by having these axes mutually parallel, the handle arrangement may advantageously be provided in a more compact form. A further advantage of having the first and second axis arranged mutually parallel is that the handle may be rotated along a plane parallel to the surface of the openable element. This may be a preferable embodiment depending on the structure of the openable element and its surrounding.

According to one further embodiment, said third axis is perpendicular to said first axis and said second axis. By designing the handle arrangement so that the motion converter is moveable in this direction, the handle arrangement can be made even more compact.

According to one further embodiment, said handle comprises an elongated slot configured to guide said motion converter such that the handle may be unsecured from a secured position to rotate into an intermediate position without translating said motion converter gear rack along the third axis. In this intermediate position, the non-coupled end of the handle is sufficiently rotated away from the housing such that a wide space in-between the back side of the handle grip and the front side of the housing has been established. The space may be sufficiently vast so that a user may readily insert a portion of his or her hand therein to grasp the handle. An advantage of this is that the handle can easily be moved into the intermediate position without having to exert any substantial force on the motion converter. Hence, the handle can conveniently be positioned in this intermediate position to be rotated further to open an openable element. A further advantage with the handle being released to the intermediate position may be that such movement of the handle may indicate that the handle arrangement has been unlocked by a locking device when such locking device is provided in the handle arrangement. It may thereby be visually seen that the locking device is opened and the handle can be operated.

According to one further embodiment, said motion converter may comprise a linking element comprising two end portions wherein one end portion is rotatably coupled to said gear rack and the other end portion is rotatably coupled to said handle. The linking element may be rotatably coupled to said gear rack by an axle engaging with corresponding slots, recesses or holes in said gear rack allowing for rotation around a fifth axis. The linking element may be rotatably coupled to the handle by an axle engaging with corresponding slots, recesses or holes in the handle, possibly in the handle coupling portion. The rotational axis between the motion converter and the handle at axis D may be provided between the linking element and the handle. By having this linking element, the rotation of the handle can more conveniently be converted to a linear motion of the gear rack. When the handle is rotated into the intermediate position, the linking element may simply be unmoved due to the elongated slot. When the handle is rotated further, the linking element may be rotated around the coupling to the gear rack around said fifth axis while the whole motion converter, the linking element and the gear rack, is translated toward the handle. Such an embodiment, advantageously, results in an easy conversion from a rotation to a linear motion and eventually into a rotational motion again when the gear rack is translated relative the connecting element gear. The pre-biased spring and abutting element of the motion converter may be provided in said linking element.

According to one further embodiment, said motion converter may comprise an elongated slot guiding the motion of said abutting element when said handle is unsecured from said secured position to rotate into said intermediate position. An advantage of this is that the abutting element is prevented from twisting as it is pushed toward the handle. Furthermore, the elongated slot may be designed to only allow for linear motion. The pre-biased spring may be arranged such that its axis of compression and expansion is parallel with the elongated slot. Then the pre-biased spring may push the abutting element directly toward the handle coupling portion, with reduced friction of the abutting element when moving along the guide slot. The motion converter may be arranged with multiple guide slots, preferably two located along the inner walls of the cavity of the motion converter, arranged on opposite sides relative to the abutting element. The abutting element may be arranged with an engaging portion for each guiding slot the abutting element interacts with. The engaging portions may extend out from the main body of the abutting element defining an engaging portion axis. The engaging portion extension may be cylindrical in shape and the guide slot configured for receiving said engaging portion extension. The abutting element may be configured to rotate around the engaging portion axis so that it may rotate into a more suitable position when making contact with the receiving surface of the handle coupling portion. The interface between the engaging portion surface and the contact surface along the guide slot may be low-frictional, further facilitating the pre-biased spring to push the abutting element toward the handle coupling portion. The abutting element may have a spherical shape from which the engaging portions extend from. The abutting element may be arranged with an inclined surface configured to extend beneath the handle coupling portion to guide the handle's rotation into the intermediate position.

According to one further embodiment, the contact interface between said abutting element and said handle may be inclined relative to the direction of contact the abutting element makes with the handle. By having an inclined interface relative to the direction of contact, the abutting element may under the influence of the spring push the handle automatically into the intermediate position when released from the latching mechanism securing the handle to the housing. The inclined contact interface may be established by arranging the receiving surface of the handle coupling portion inclined relative the longitudinal axis of the handle grip. Thus, when the handle is in a closed position, the receiving surface will be inclined with respect to the direction of contact the abutting element makes with the receiving surface under influence of the pre-biased spring. This results in a force directed away from the housing causing the handle, if unsecured from the housing, to rotate around the first axis.

Further, the inclined contact interface may be established by providing the abutting element with a wedge having an inclined surface. The abutting element may be arranged such that the wedge faces the receiving surface of the handle coupling portion. The wedge of the abutting element may be pressed toward and along the receiving surface, and follow the receiving surface behind the handle coupling portion. The abutting element may be prevented, at least partly, from rotating around the engaging portion axis. Hence, the wedge of the abutting element, when making contact with the receiving surface, will result in a force directed away from the housing causing the handle, if unsecured from the housing, to rotate around the first axis.

An advantage of this is that the handle may consequently assume the intermediate position whenever a user unsecures the latch from the latch receiving element of the handle. The user may not have to pry the handle away from the housing. A further advantage of this is that the handle and the housing can mutually enclose the interior mechanical components such that the amount of exposed edges vulnerable for tinkering is reduced, thus making the handle arrangement even more protected and secure.

According to one further embodiment, wherein the cogs of said gear are distributed along a portion of the circumference of the gear on a motion converter gear rack facing side. I.e., along a portion of the circumference of the gear, no cogs may be provided. Thus, cogs may be distributed along a portion of the circumference of the gear, only where they may be needed. For instance, if the gear only needs to rotate 90 degrees in order for the coupled latching mechanism of the openable element to be moved between a latching position and an unlatched position, then cogs may be distributed along a quarter of the whole circumference of the gear. An advantage of this is to reduce the amount of material so that the handle arrangement may be even more compact, and reduce material cost.

According to one further embodiment, said motion converter comprises a second gear rack arranged adjacently to said gear on the opposite side relative the first motion converter gear rack. An advantage of this is that the second gear rack may be used as a support rack primarily to help the gear to fully engage with the first gear rack and keeping it leveled. If the second gear rack is constructed like the first gear rack, then the gear may be configured such that no cogs of the gear engages with the second gear rack during the full range of rotation of the gear. The second gear rack may be arranged having no cut teeth, and only be arranged with a guiding slot primarily having the purpose of supporting the cogs of the gear. In that case, the gear may be provided with cogs along the whole of its circumference.

According to one further embodiment, said handle arrangement comprises a spring placed in-between the gear and the housing. The spring may be placed in-between an inner wall of the interior of the housing and the gear. The spring may be arranged pre-biased to push the gear along the second axis, either away from or toward the surface of the openable element the housing is arranged to. An advantage of this may be an improved capability of rotating around the second axis. Further, the spring may also exert a torque on the gear to counteract a rotation from a reference orientation. The reference orientation of the gear may be chosen either as its position when the handle is secured to the housing, or its position when the handle is fully opened. By applying a torque on the gear, the mechanical components may be substantially protected from a jerking of the handle which may cause permanent damage to the interior mechanical components otherwise. Furthermore, the pre-biased spring may be configured to abut a connecting element, when such an element is arranged to the gear. The pre-biased spring may extend through an opening of the gear into a cavity of the connecting element along the second axis and couple to the interior of the cavity of the connecting element.

According to one further embodiment, said handle arrangement comprises a distance element placed in-between the gear and the housing. The distance element may be placed in-between an inner wall of the interior of the housing and the gear. The distance element may be arranged to displace the gear along the second axis, away from any interior wall of the housing. The distance element may be provided with a low-frictional surface facilitating the gear to rotate around the second axis. The distance element may be provided in a shape of a disc having a hole through which it may connect to the gear. If a spring is also arranged in-between the gear and the housing to support the gear along the second axis, the distance element may be arranged on the opposite side of the gear relative the spring, such that the spring and the distance element sandwich the gear element along the second axis. If a connecting element is arranged to the gear, the distance element may be configured to abut the connecting element.

According to a further embodiment, said handle comprises a coupling recess arranged in-between the handle grip and the handle coupling portion, the coupling recess configured to receive a front facing edge of the housing when the handle is rotated into a maximally open position. An advantage of this is that the handle may be provided with a wide range of rotation, while providing a compact and secure handle arrangement.

According to a second aspect of the invention, a use of a handle arrangement for releasing or securing a door in a compact environment is provided. The door to be opened comprises a latching mechanism having a latched position in which the door is secured to a door frame and an unlatched position in which the door is released, wherein said connecting element is coupled to the latching mechanism such that a rotation of the connecting element around said second axis moves the latching mechanism between the latched position and the unlatched position.

BRIEF DESCRIPTION OF THE DRAWINGS

The invention will in the following be described in more detail with reference to the enclosed drawings, wherein:

FIG. 3-5 are perspective views of some elements of the handle arrangement according to one embodiment of the present disclosure;

FIG. 15a-b, are side views of an assembly of the locking device, latching element, a housing support plate and the handle, in a secured and released position respectively, according to one embodiment of the present disclosure;

DESCRIPTION OF EMBODIMENTS

Figure 1A:
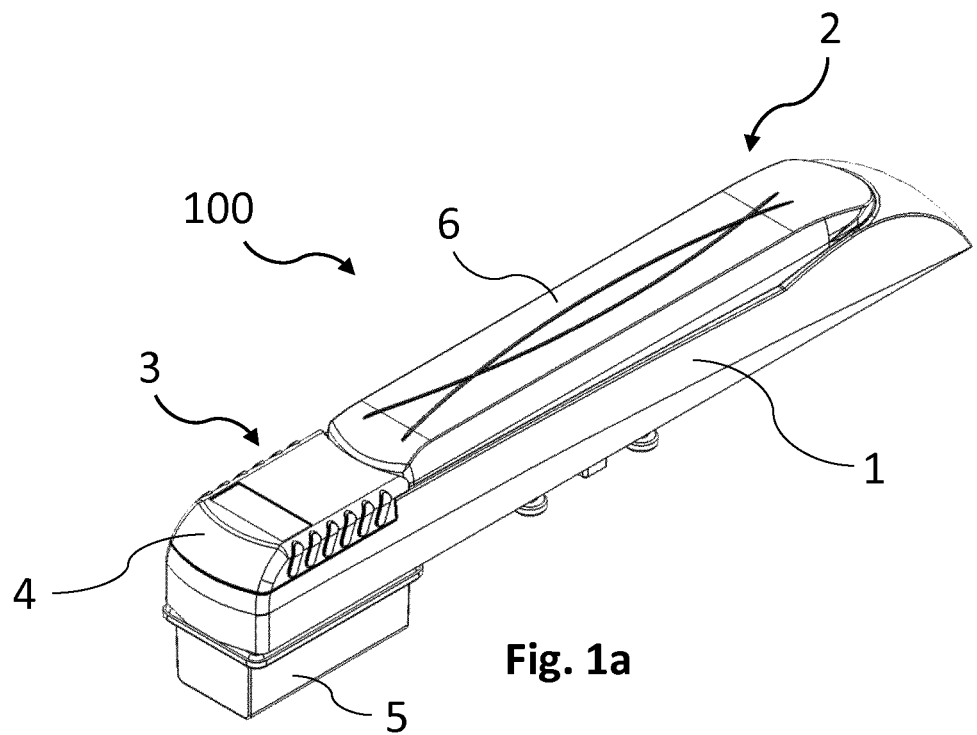
FIG. 1a-b are perspective views of the handle arrangement in a closed and open position respectively according to one embodiment of the present disclosure.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. In the drawings and specification, there have been disclosed preferred embodiments and examples of the invention and, although specific terms are employed, they are used in a generic and descriptive sense only and not for the purpose of limitation, the scope of the invention being set forth in the following claims.

Figure 1B:
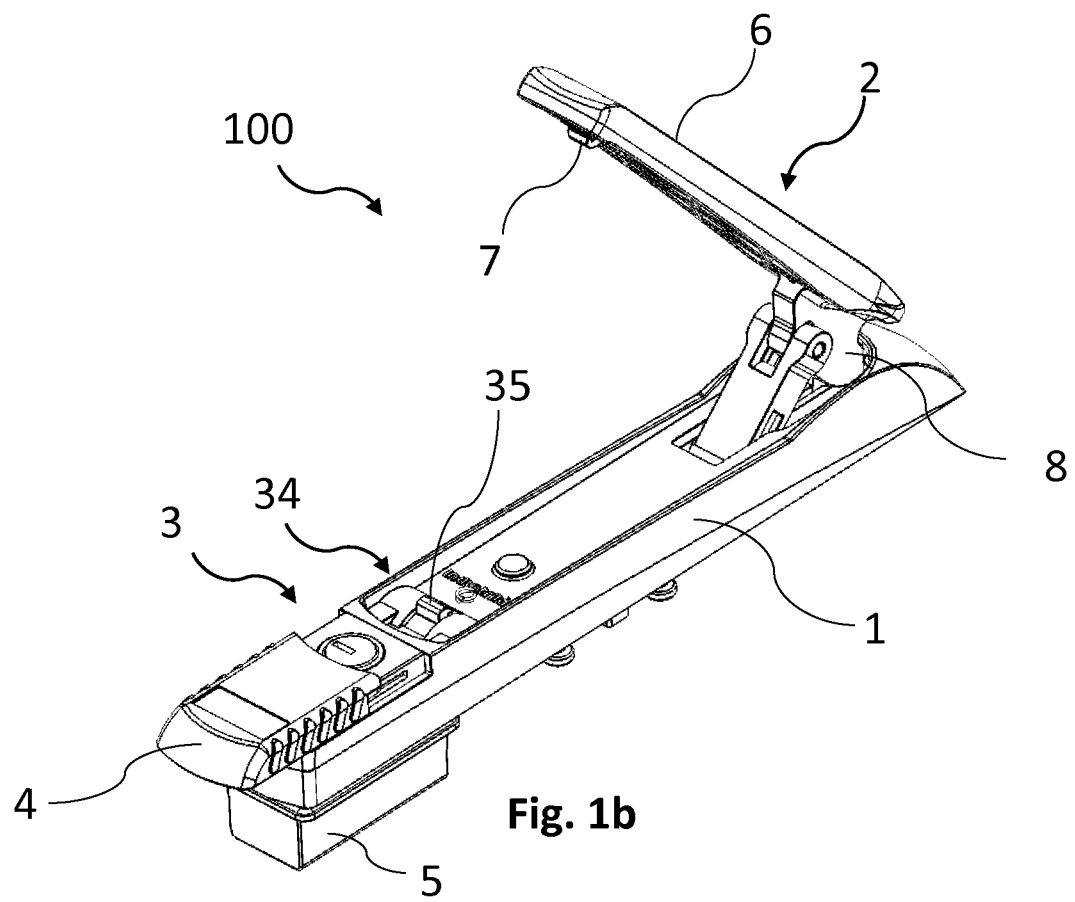

The handle arrangement 100 of the present disclosure comprises a housing 1 and a handle 2, see FIG. 1a and FIG. 1b. The housing 1 has a shape which is primarily extending along a certain direction, hereafter referenced as the longitudinal direction, or longitudinal axis. The housing 1 has a back side which is substantially rectangular in shape and is configured to face an openable element, for instance a door, when arranged to said openable element. The housing 1 has a front side configured to face away from the openable element when the housing 1 is arranged thereto. The handle 2 comprises a handle grip 6 and a handle coupling portion 8. The handle 2 is rotatably connected via the handle coupling portion 8 to the housing 1 and is arranged in a recess located on the front side of the housing 1 when the handle is in a closed position, see FIG. 1a. The handle 2 may be rotated away from its closed position in the housing 1 to a maximally open position, see FIG. 1b.

A locking device 3 may be accessed by displacing a shutter 4 through a sliding motion, the shutter 4 sliding along slots located on the housing 1. The locking device 3 may be a cylinder lock. The locking device 3 is configured to engage with a latching element 34 inside the housing 1. The latching element 34 comprises a latch 35 protruding through the front side of the housing 1 to latch onto a latch receiving element 7 located on the back side of the handle grip 6. When the handle 2 is in a closed position, the latch 35 engages with the latch receiving element 7, such that the handle 2 is held in place in a closed position. By interacting with the locking device 3 such that it moves the latching element 34, the latch 35 may disengage from the latch receiving element 7 such that the handle 2 is unsecured and may be rotated away from its closed position.

Furthermore, both longitudinal ends along the front side of the housing 1 are curved towards the sides of the housing 1 connecting the front and back side of the housing 1. This may provide a reduced risk of hurting a user attempting to interact with the handle 2 as the amount of sharp edges of the housing are reduced.

The housing 1 also comprises a casing 5 located on the back side of the housing 1. The casing 5 is designed to protect the locking device 3, which may extend beyond the back side of the housing 1. An openable element to which the handle arrangement 100 is to be arranged to is configured to have a corresponding cavity or opening so that the handle arrangement 100 can be arranged properly to the openable element. The locking device 3 may be configured to also be coupled with a latching means of an openable element directly, such that the locking device may control both the first latching mechanism of the handle arrangement 100 and the latching means of the openable element.

Figure 2A:
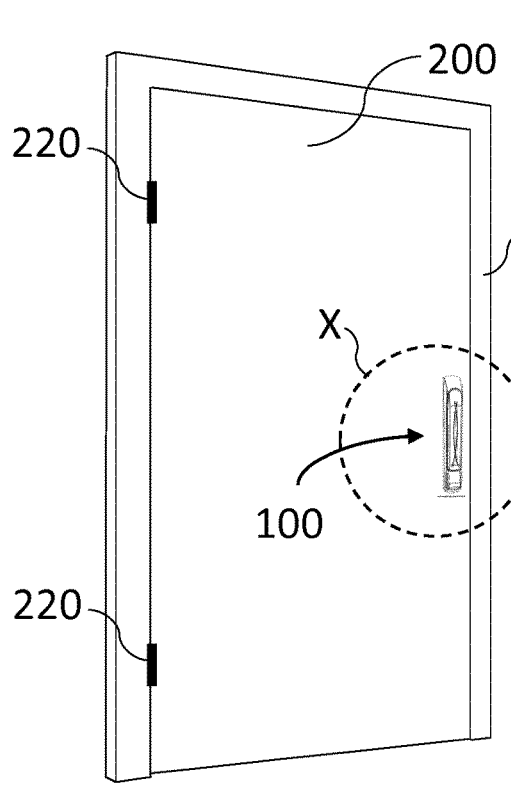
FIG. 2a-d are perspective views of the handle arrangement when arranged to a door in a closed and open position, and a zoomed in portion of the handle arrangement when arranged to the door, respectively, according to one embodiment of the present disclosure.
Figure 2B:
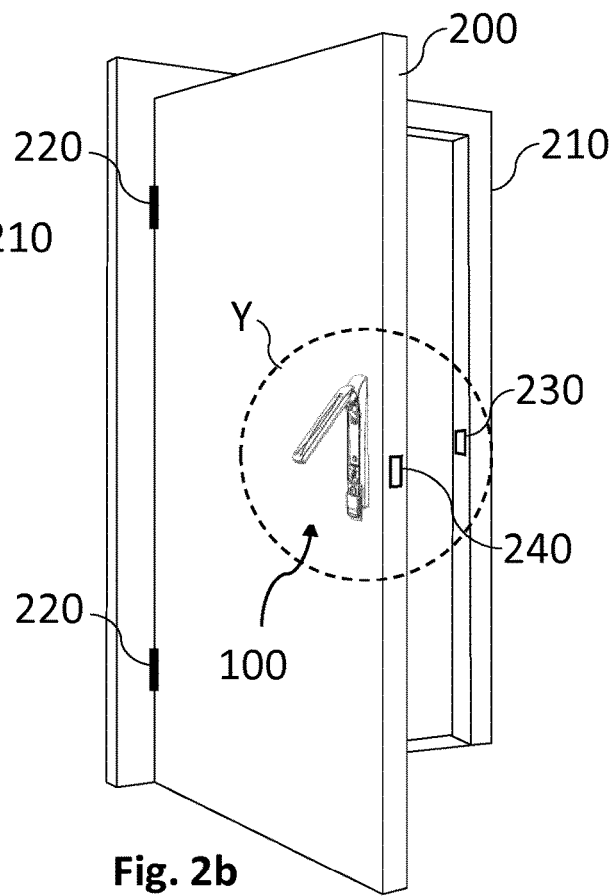
Figure 2C:
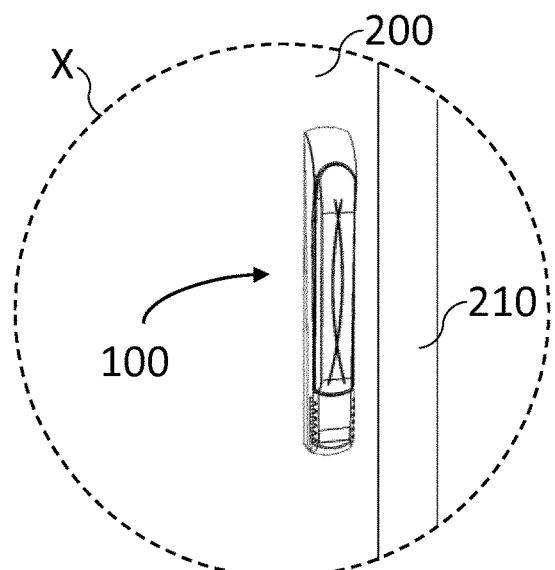
Figure 2D:
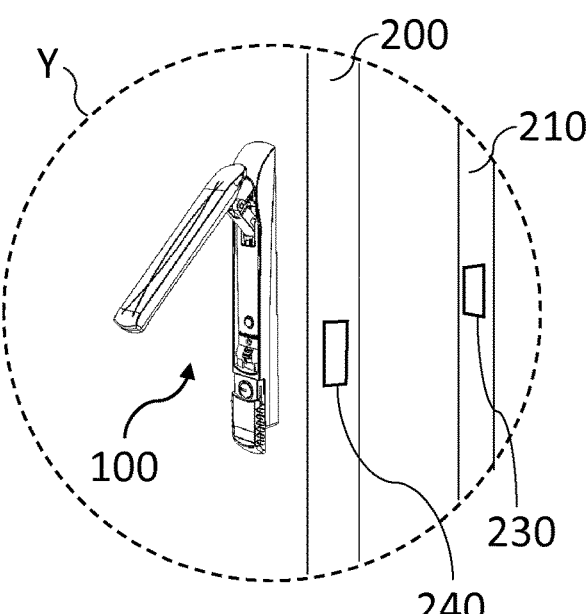

The handle arrangement 100 may be arranged to an openable element, in this case a door 200, see FIG. 2a-b. The door 200 is rotatably coupled to a door frame 210 via hinges 220. The door 200 comprises latching means 240 configured to engage with catch means 230 located in the door frame 210 to secure the door 200 in a closed position. The door is in a closed position in FIG. 2a. In FIG. 2b, the handle 2 of the handle arrangement 100 has been rotated from a closed position to an open position, so that the door 200 has been released from its secured position and moved into an open state. FIG. 2c-d show zoomed in portions X and Y marked in FIG. 2a-b respectively.

The handle 2 of the handle arrangement 100 is substantially of an elongated shape, extending primarily along a direction defined as the longitudinal direction, see FIG. 3. The handle 2 comprises a handle grip 6 and a handle coupling portion 8. The handle grip 6 has a front side and a back side, the back side arranged facing toward the front side of the housing 1 when in a closed position. The front side of the handle grip faces away from the front side of the housing 1 when in a closed position. The handle coupling portion 8 is located at a back side of the gripping portion 6 and is arranged near a longitudinal end of the handle grip 6. The handle coupling portion 8 is configured to fit in a cavity of the housing 1 when the handle 2 is in a closed position. The handle coupling portion 8 comprises a protruding portion 9, extending symmetrically from the coupling portion 8 in a direction which is substantially perpendicular to the longitudinal direction of the handle grip 6, specifically along a first axis A. The handle coupling portion 8 also comprises a slot 10. The slot 10 extends through the handle coupling portion along a fourth axis D, said fourth axis D being parallel to first axis A and offset from first axis A. The slot 10 is elongated along the side of the handle coupling portion 8. The slot 10 is curved along said side of the handle coupling portion 8. The slot 10 has curved interior walls configured to receive a cylindrical object, such as an axle. Such an axle may be moveable along the surface-elongated slot in a sliding motion. The elongated slot 10 may also allow such an axle to rotate when arranged inside said slot 10. The handle coupling portion 8 is connected to the handle grip 6 at an offset from the back side end such that a coupling recess 12 between the handle coupling portion 8 and the handle grip 6 of the handle 2 is provided. The coupling recess 12 is configured to receive a front side edge 19 of the housing 1. Further, the handle coupling portion 8 is curved such that the protruding portion 9 is located closer to a plane defined by the back side of the handle grip 6 of the handle 2. This allows for the handle 2, which is to be rotated around the first axis A, when arranged to the housing 1, to be closer fixed to the housing 1.

Figure 7:
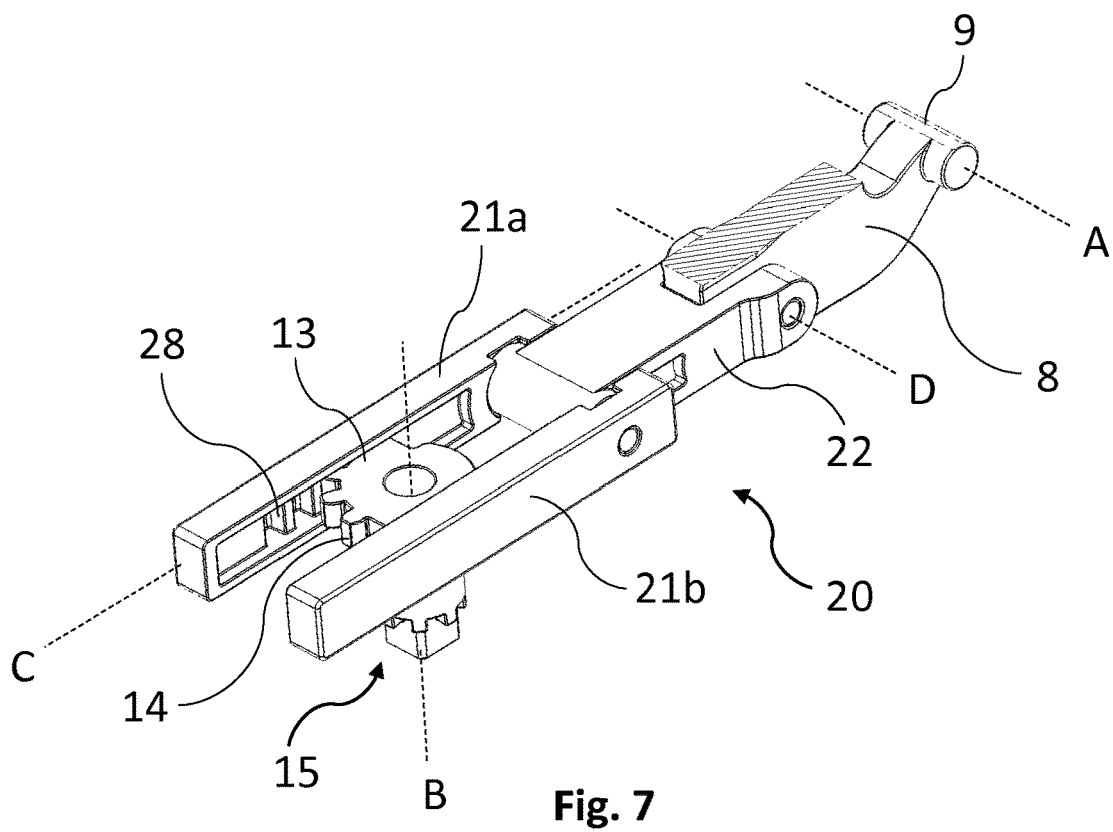
FIG. 7 is a perspective view wherein a portion of the handle has been cut off to more clearly disclose some assembled elements of the handle arrangement according to one embodiment of the present disclosure.
Figure 12:
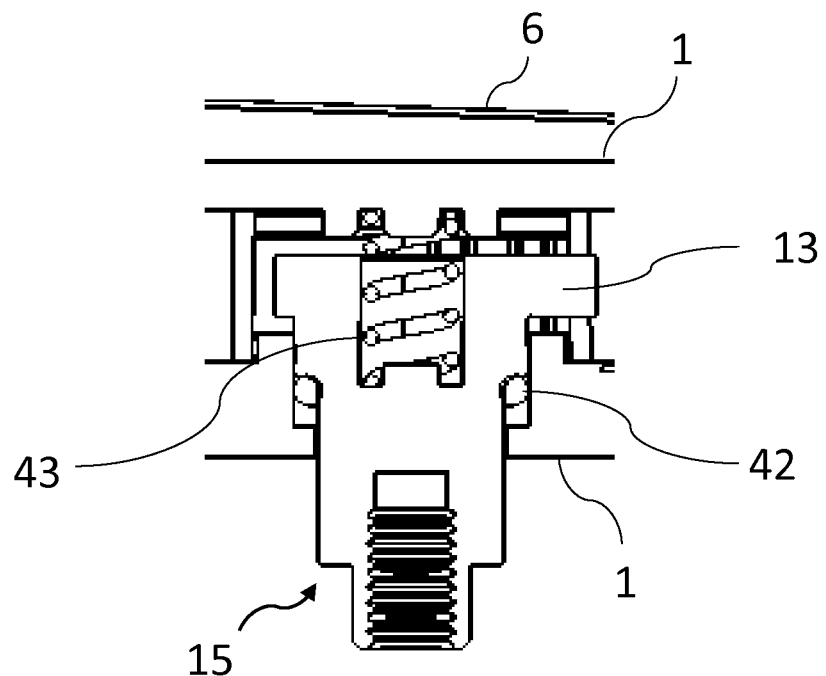
FIG. 12 is a zoomed-in cross sectional side view of the connecting element according to one embodiment of the present disclosure.

The handle arrangement 100 further comprises a gear 13, see FIGS. 4, 7 and 12. To the gear 13, a connecting element 15 may be connected. The connecting element 15 has an elongated shape, extending along a second axis B, wherein a portion of the connecting element is cylindrical in shape, the central portion 16. The cross section of the central portion 16 along the second axis B may be circular. One end 17 of the connecting element 15 is configured to couple with a coupling element of a latching means of an openable element. Said coupling end 17 may be substantially square-like. The interface between the central portion 16 and the coupling end 17, may be provided with a cog-like structure having cogs 18 distributed at least along a portion of the circumference of the connecting element 15 along this interface. This cog-like structure may conveniently engage with corresponding cog-like structure of said coupling element. The gear 13 may be located on the opposite longitudinal end of the connecting element 15 relative the coupling end 17 of said connecting element 15. The gear 13 is arranged along a plane perpendicular to the second axis B. The gear 13 comprises cogs 14 along a portion of the circumference of the gear 13, approximately along 90 degrees along the circumference. A cavity of the connecting element 15 extends from an opening centrally placed on a side of the gear 4 around the second axis B and extends a depth into the connecting element 15. This cavity will be discussed in more detail below.

The handle arrangement 100 further comprises a motion converter 20, see FIG. 5. The motion converter 20 comprises a pair of gear racks 21a, 21b extending along a third axis C. The gear racks 21a, 21b are substantially cuboidal in shape and of the same size. The gear racks 21a, 21b are rotatably coupled to a linking element 22 via an axle 25. The insides of the gear rack 21a, 21b facing each other are provided with slots 27, the slots 27 having a length running parallel to the third axis C, a width defining the slots 27 extension perpendicular to the third axis C and the rotational axis of the gear rack linking element coupling, and a depth defining the slots 27 extension perpendicular to the third axis C and parallel to the rotational axis of the gear rack linking element coupling. The width of each slot 27 is configured to be at least as wide as the thickness of the gear cogs 14, such that the gear cogs 14 may engage in said slots 27. At least one slot 27 is provided with cut teeth 28 for engaging with gear cogs 14. The opposite gear rack 21a, 21b may have essentially a supporting function only.

The linking element 22 also has an elongated shape, more specifically a Y-shape. The linking element comprises a first 23 and a second end portion 24, wherein one end portion 23 is rotatably coupled to the gear racks 21a, 21b by said axle 25. The opposite end portion 24, the portion corresponding to the top part of a Y, is configured to be rotatably coupled to the handle 2 via an axle 26 which is configured to be arranged in the slot 10 of the handle coupling portion 8. The linking element 22 may, due to said slot 10 being elongated, be both translated and rotated relative the handle 2.

Figure 6:
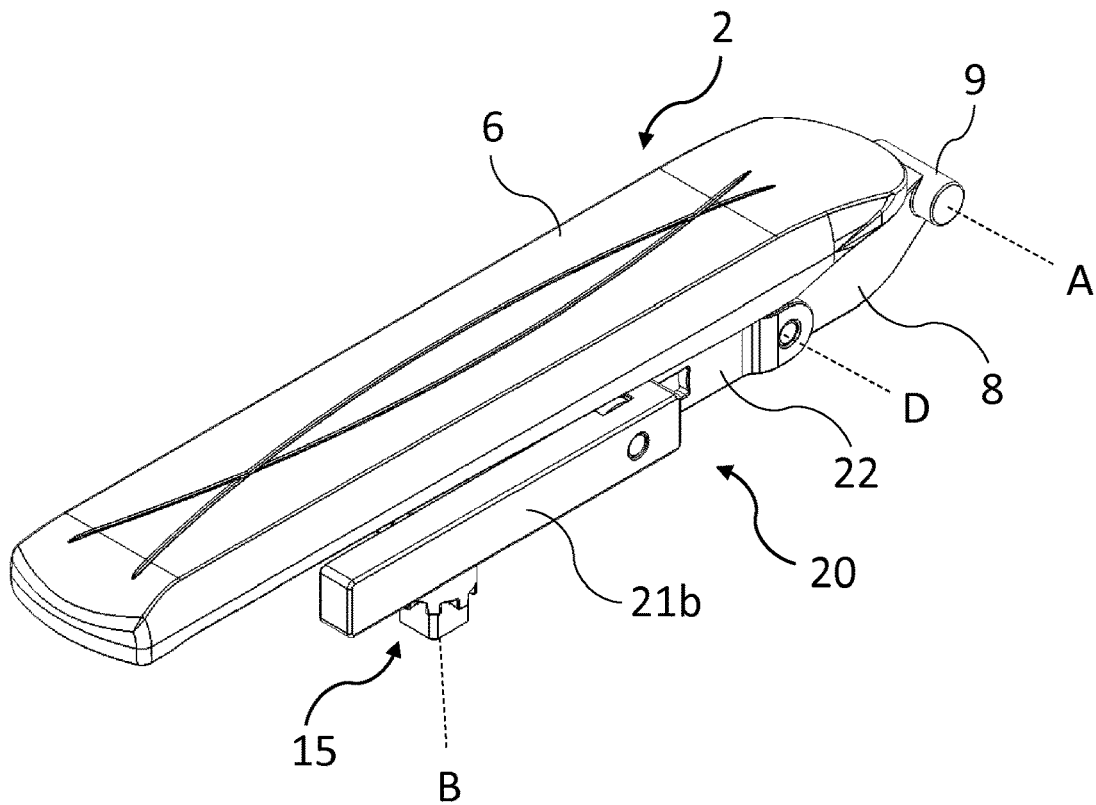
FIG. 6 is a perspective view of some assembled elements of the handle arrangement in a closed position according to one embodiment of the present disclosure.

The motion converter 20, the gear 13, the connecting element 15 and the handle 2 are assembled in FIG. 6 and FIG. 7. FIG. 7 specifically depicts the assembled components, wherein a portion of the handle 2 is excluded from the view, in order to show the structural arrangement more clearly. In FIG. 6 and FIG. 7, the handle 2 is in a closed position. In this position, the motion converter 20 is essentially arranged parallel relative the handle grip 6 of the handle 2. The motion converter 20 and the handle 2 are coupled to each other via the handle coupling portion 8. Both gear racks 21a, 21b and the linking element 22 are arranged in the same plane, and arranged along the third axis C and perpendicular to the first axis A when the handle 2 is in a closed position. The connecting element 15 is arranged such that the second axis B is substantially perpendicular to both the first axis A and the third axis C. The gear racks 21a, 21b are arranged such that they sandwich the gear 13 such that a portion of the gear 13 rests within the slots 27 of the gear racks 21a, 21b. Further, the gear 13 is arranged such that the cogs 14 of the gear 13 engages with cut teeth 28 on the gear rack 21a. Either gear rack 21a, 21b may comprise the cut teeth and the gear 13 may be arranged accordingly, such that the functionality of the handle arrangement 100 remains the same.

Figure 8:
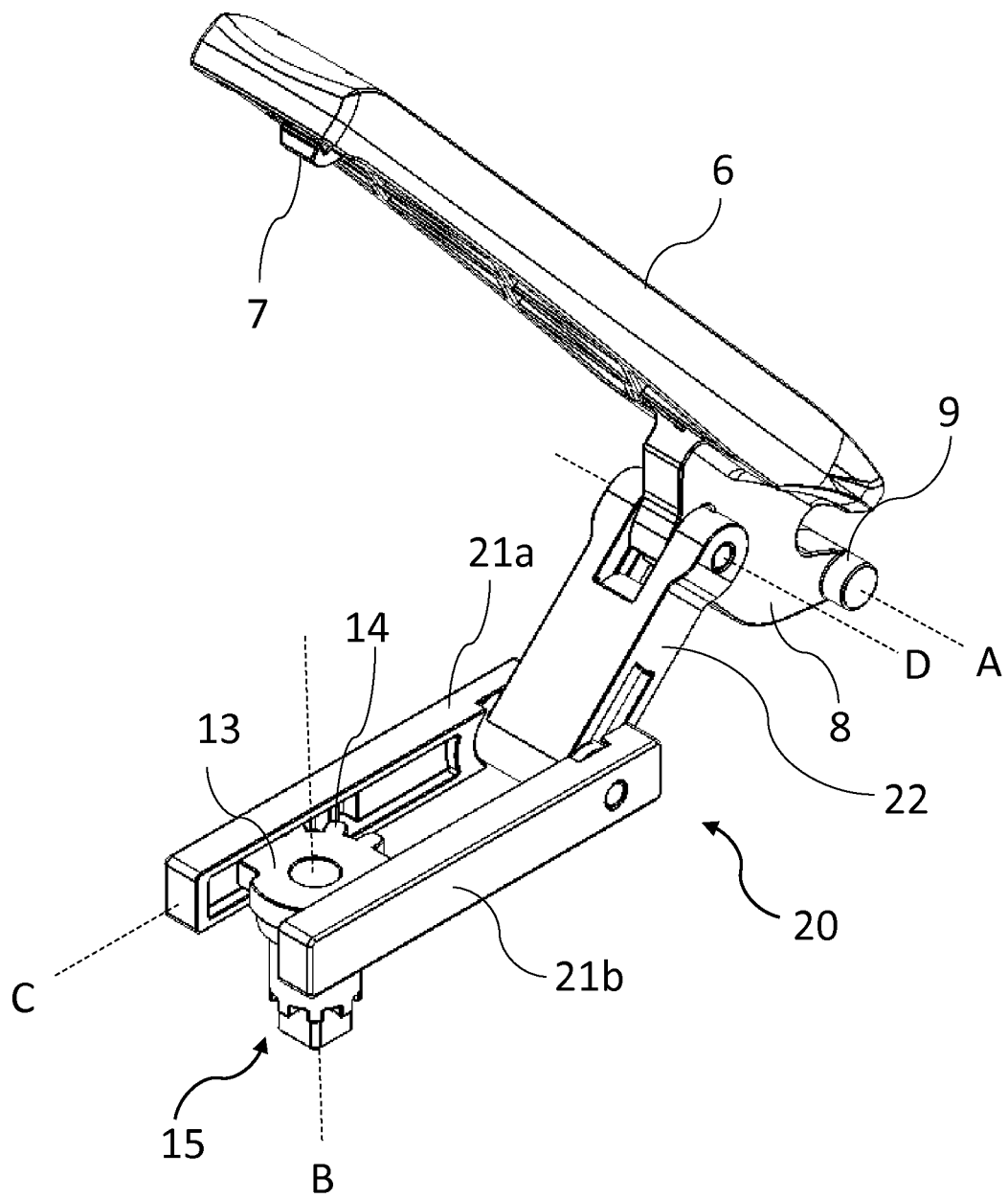
FIG. 8 is a perspective view of some elements of the handle arrangement in an open position according to one embodiment of the present disclosure.

The handle 2 may be rotated into a maximally open position. The same assembly as depicted in FIG. 6 and FIG. 7 is now depicted in this maximally open position in FIG. 8. When the handle 2 is moved into this maximally open position, the motion converter 20 follows the handle 2 due to the coupling of the axle 26 to the handle coupling portion 8. When the motion converter 20 follows the handle 2, it converts the rotation of the handle 2 into a rotation of the connecting element 15 and the gear 14 around the second axis B via the gear racks 21a, 21b and the linking element 22.

Figure 9A:
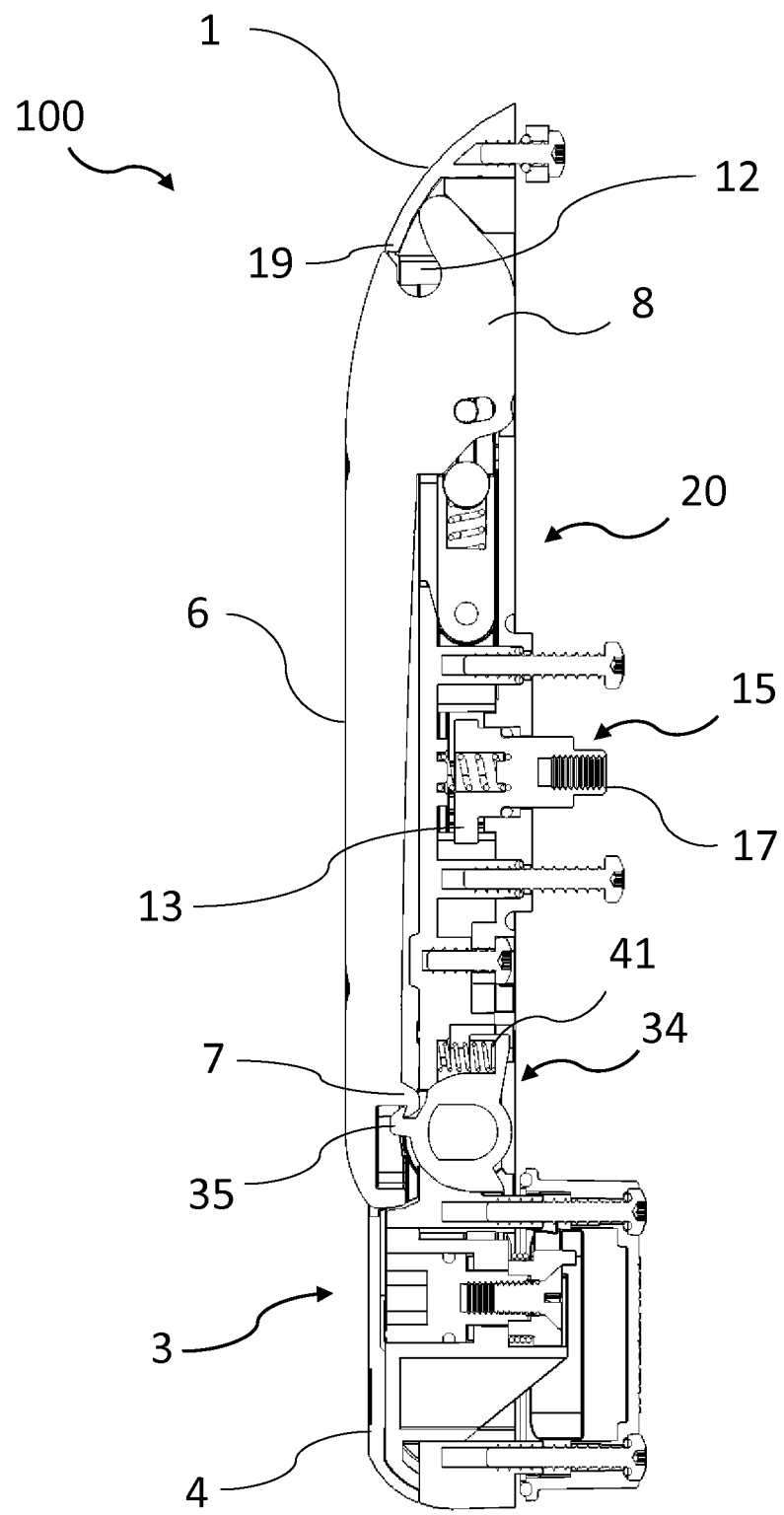
FIG. 9a-b is a cross sectional side view of the handle arrangement in a closed and open position respectively according to one embodiment of the present disclosure.
Figure 9B:
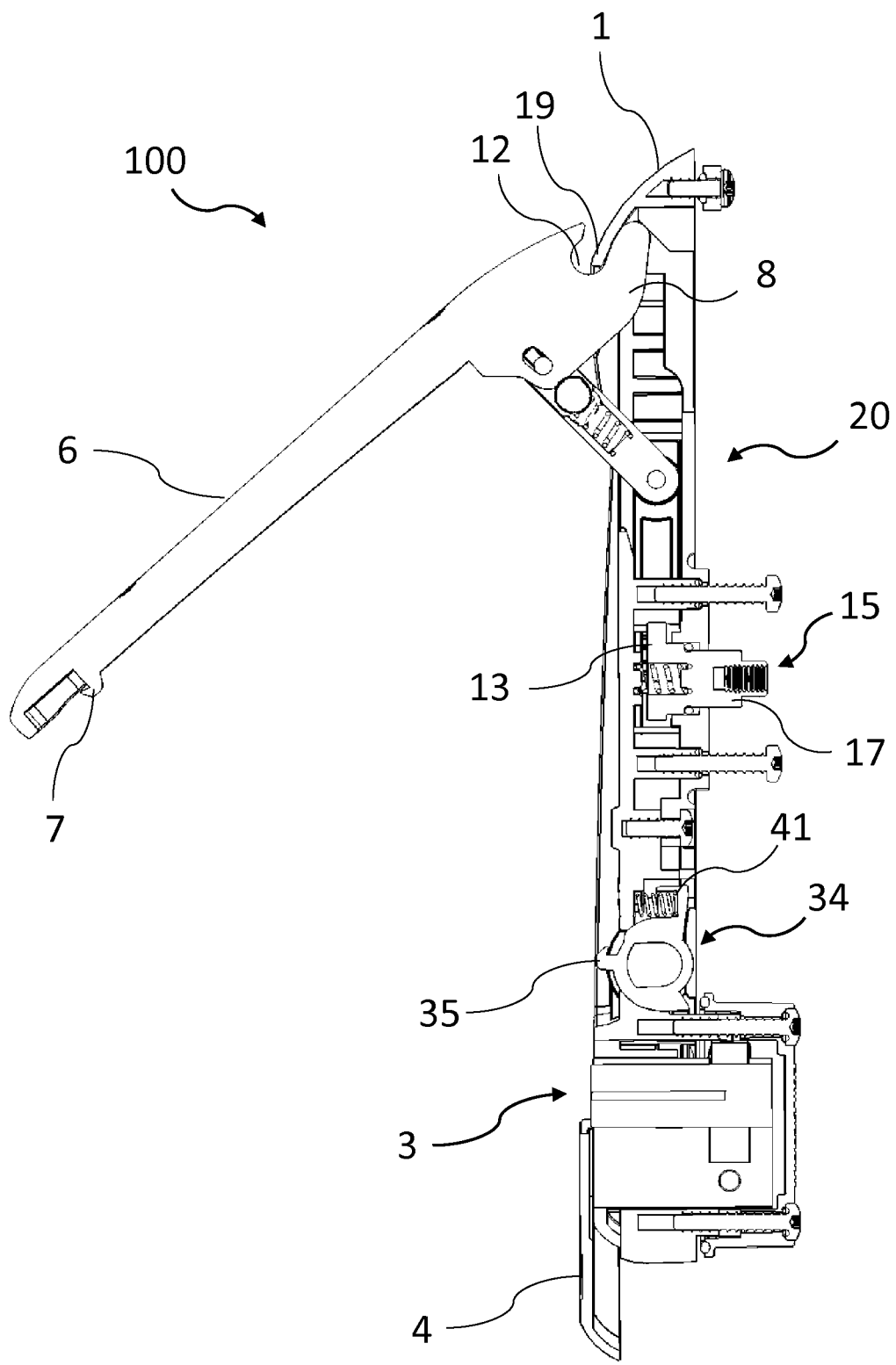

FIGS. 9a and 9b depict a cross-sectional view of the handle arrangement according to one of the embodiments. Specifically, FIG. 9a depicts the handle arrangement 100 when the handle 2 is in a closed position. FIG. 9b depicts the handle arrangement 100 when the handle 2 is in a maximally open position.

Figure 10A:
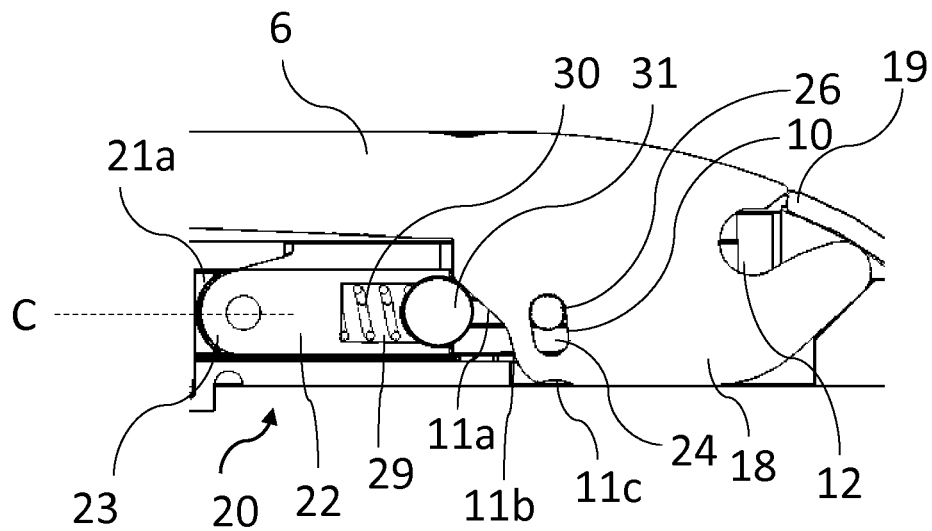
FIG. 10a-b are zoomed-in cross sectional side views of the handle arrangement in a closed and open position respectively according to one embodiment of the present disclosure.
Figure 10B:
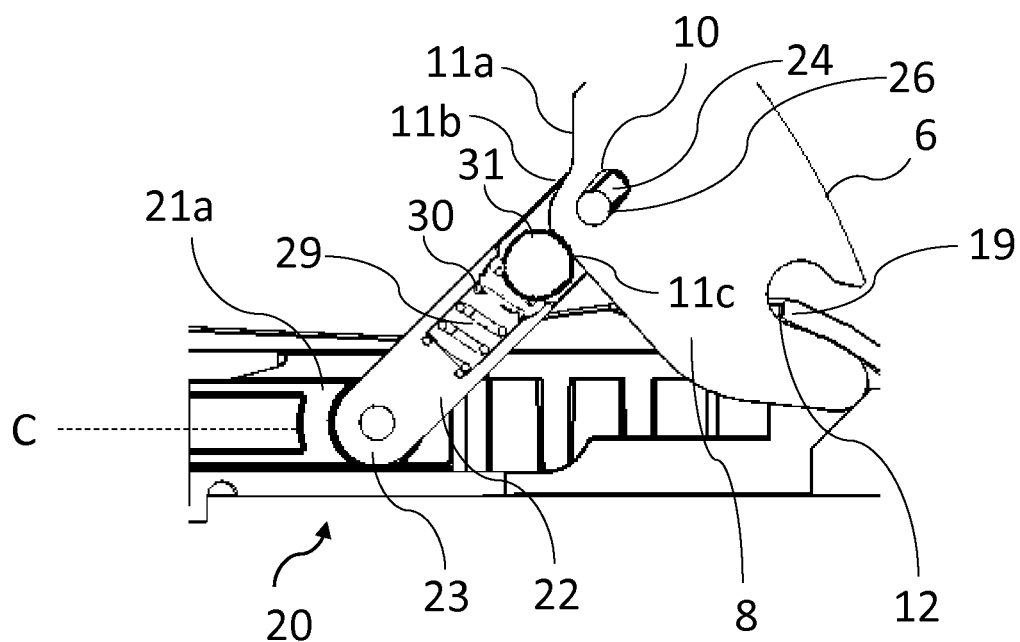

The motion converter 20 is depicted in FIGS. 10a-b. In FIG. 10a, the handle 2 is in a closed position. The front side surface of the gripping portion 6 of the handle 2 joins the front facing edge 19 of the housing 1 to create a seamless, and substantially continuous boundary between the handle grip 6 and the housing 1. The handle coupling portion 8 resides completely within a cavity of the housing 1, in particular, the handle coupling portion recess 12 is located beneath said front facing edge 19 of the housing 1. Furthermore, the motion converter 20 and in particular the linking element 22 is arranged to extend along the third axis C. In this position, the axle 26 coupling an end portion 24 of the linking element 22 to the handle coupling portion 18 is positioned in the elongated slot 10 at an end closer to the top side surface of the handle grip 6.

Within the motion converter 20 there is a cavity 29 for holding a pre-biased spring 30 and an abutting element 31. In some embodiments, this cavity 29 is specifically placed within the linking element 22. The pre-biased spring 30 pushes the abutting element 31 toward a receiving surface 11 located along a side of the handle coupling portion 8 facing the motion converter 20. The pre-biased spring 30 pushes the abutting element 31 along the longitudinal extension of the motion converter 20. The receiving surface 11 comprises a first 11a and a second receiving surface portion 11b, each receiving surface portion 11a, 11b inclined relative the third axis C when the handle 2 is in a closed position. The first receiving surface portion 11a is less inclined relative to the third axis C than the second receiving surface portion 11b. When the handle 2 is in a closed position, the abutting element 31 abuts the first receiving surface portion 11a. When the handle 2 is released from its closed position, i.e., the latch 35 keeping the handle 2 in place is disengaged from the latch receiving element 7 on the bottom side of the handle gripping portion 6, then the pre-biased spring 30 is capable of pushing the abutting element 31 along the receiving surface 11a such that the handle 2 is starting to rotate. The rotation is maintained until the abutting element 31 has been pushed into the curved boundary between the first receiving surface portion 11a and the second receiving portion 11b. The amount of rotation of the handle 2 depends on the inclination of the receiving surface portions 11a, 11b and the spring force in the spring 29. When the abutting element 31 is located here, the pre-biased spring 30 is unable on its own to push the abutting element 31 further due to the abutting element 31 being essentially trapped in-between the first receiving portion 11a and the second receiving portion 11b. When the abutting element 31 is placed here, the handle 2 has been rotated into an intermediate position. In this position, a wide space in-between the gripping portion 6 of the handle 2 and the front side of the housing 1 has been created, allowing a user to grab the handle gripping portion 6 and rotate it further.

In particular, in this intermediate position, the motion converter 20 has only been partly moved. The gear racks 21a, 21b haven't yet been forced to translate relative the housing 1. This functionality is an effect of the slot 10 being elongated. In the closed position, the axle 26 of the handle arrangement 100 resides at one end of the elongated slot 10. When the handle 2 is moved into the intermediate position, the axle 26 is moved along the slot 10 toward the opposite end of the elongated slot 10. Only by rotating the handle 2 further from the housing 1, away from the intermediate position will the gear racks 21a, 21b translate relative the housing 1 along the third axis C, such that the gear 13 starts to rotate. The handle 2 may be rotated into a maximally open position as in FIG. 10b. In this position, the gear racks 21a, 21b have been translated so as to rotate the gear 13 fully. Furthermore, the abutting element 31 has been pushed into an abutting element receiving surface 11c configured to engage with the abutting element 31 and keep it in place. By having this abutting element 31 placed within the abutting element receiving surface 11c, the handle 2 will be locked in its corresponding maximally open position. The abutting element 31 may be disengaged from this position by applying a sufficiently strong force on the handle 2 in the direction toward the housing 1 such that the spring force is counteracted and exceeded. Furthermore, when the handle 2 is in a maximally open position, the front side edge 19 of the housing 1 resides within the handle coupling portion recess 12. In this position, the handle coupling portion 8 in the vicinity of the axle 9 is fully abutting the interior wall of the housing 1, thus preventing the handle 2 from being rotated further.

Figure 11:
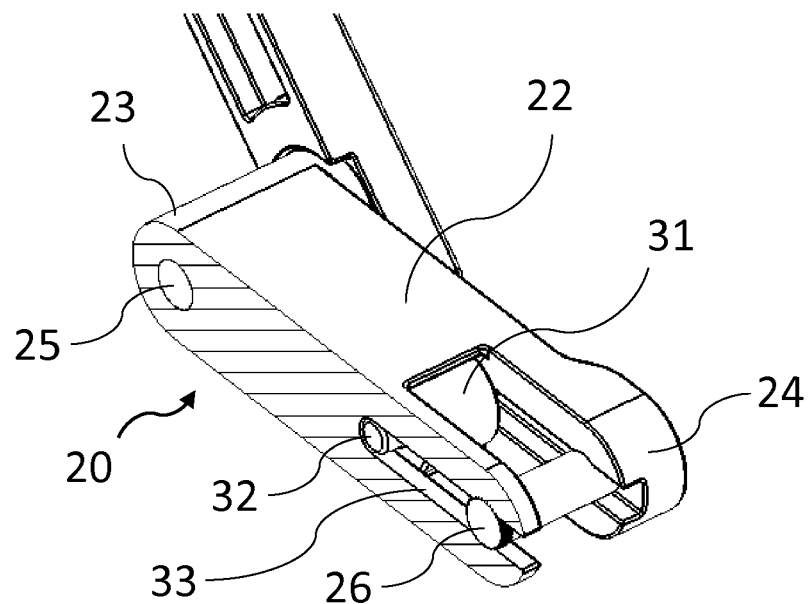
FIG. 11 is a zoomed-in perspective view of the motion converter according to one embodiment of the present disclosure.

The motion converter 20 is further depicted in FIG. 11. The movement of the abutting element 31 is guided by slots 33 when moved toward the handle coupling portion 8, which is configured to be coupled to the axle 26 at the end portion 24, under the influence of the pre-biased spring 30. A set of protruding portions 32 are configured to engage with said guiding slots 33. In one embodiment, wherein the motion converter 20 comprises the linking element 22, the guiding slots 33 are located within the linking element 22.

FIG. 12 depicts a zoomed-in cross-sectional view of the connecting element 15 when arranged inside the housing 1 when the handle 2 is in a closed position. A spring 43 is inserted into a cavity of the connecting element 15, which opens to a side of the gear 13, such that one longitudinal end of the spring 43 is abutting the interior of the connecting element 15 and the opposite longitudinal end of the spring 43 is abutting the housing 1. The spring 43 is arranged pre-biased in-between the interior of the housing 1 and the connecting element 15. The spring 43 can serve as a means for facilitating rotation of the connecting element 15 and the gear 13. The spring 43 is pre-biased such that the gear 13 is substantially engaging in the middle of the gear rack slots 27 along their respective width dimensions. Furthermore, the spring 43 may also be configured to exert a torque on the connecting element 15 when said connecting element 15 is rotated away from its resting orientation.

A distance element 42 is inserted in-between the connecting element 15 and the housing 1, on the opposite side of the spring 43 along the second axis B. Said distance element 42 extends along the circumference of the cylindrical surface of the connecting element 15. The distance element 42 and the spring 43 mutually keep the connecting element 15 to facilitate the gear 13 to engage with the gear rack 21a, 21b.

Figure 13A:
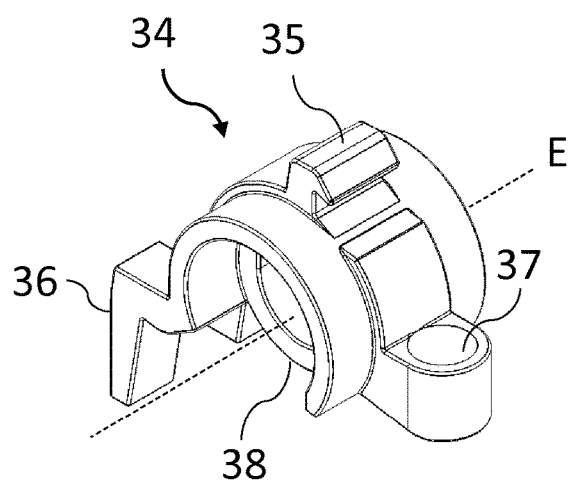
FIG. 13a is a perspective view of the latching element according to one embodiment of the present disclosure.
Figure 13B:
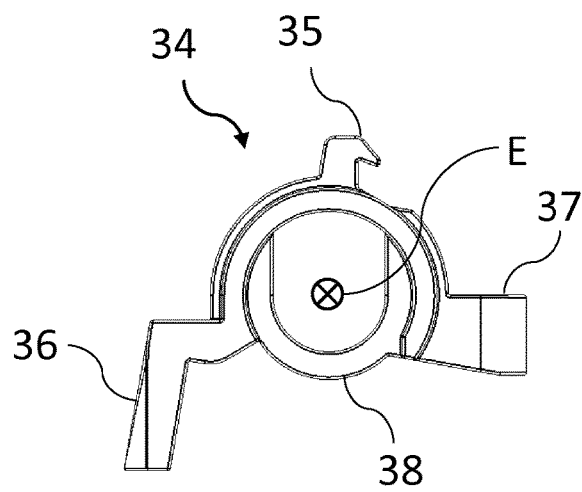
FIG. 13b is a side view of the latching element according to one embodiment of the present disclosure.

The handle arrangement 100 may also in one embodiment comprise a latching element 34, see FIG. 13a and FIG. 13b. The latching element 34 comprises a latch 35 configured to latch onto the latch receiving element 7 located on the back side of the handle grip 6. The latching element 34 may be provided with an essentially cylindrical body, either hollow or solid, and configured to be rotatable around a fifth axis E. The latching element 34 further comprises at least one flange 36 which protrude from the body of the latching element 34 on a locking device 3 facing side. The latching element 34 may be placed in a suitable cavity of the housing allowing for said rotation around fifth axis E. When arranged in said suitable cavity, the latching element 34 abuts the housing via an abutting side 38. The abutting side 38 is cylindrical in shape and the suitable cavity in the housing is configured to receive and engage with said abutting side 38. When the latching element 34 is rotating around the fifth axis E, the abutting side 38 slides along the suitable housing cavity. The latching element 34 may also comprise a further protrusion on an opposing side of the latching element body relative the locking device. Said protrusion may be provided with a spring cavity 37 configured to contain a pre-biased spring 41, see FIGS. 9*a-b* (not shown in FIGS. 13*a-b*). The spring 41 forces the latching element 34 towards a latching position.

Figure 14A:
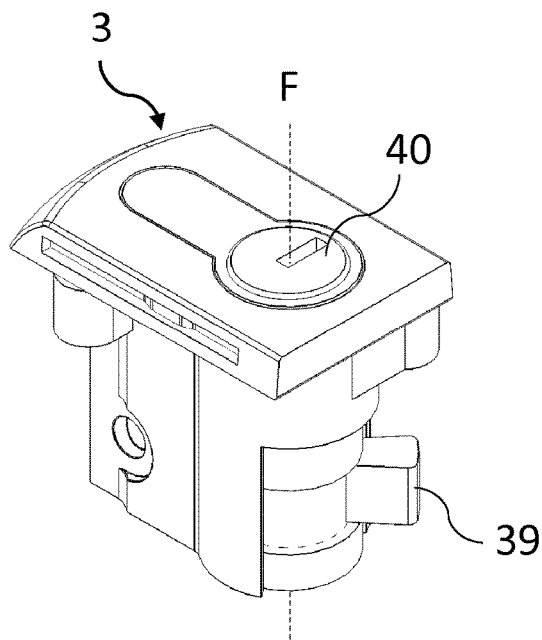
FIG. 14a is a perspective view of the locking device according to one embodiment of the present disclosure.
Figure 14B:
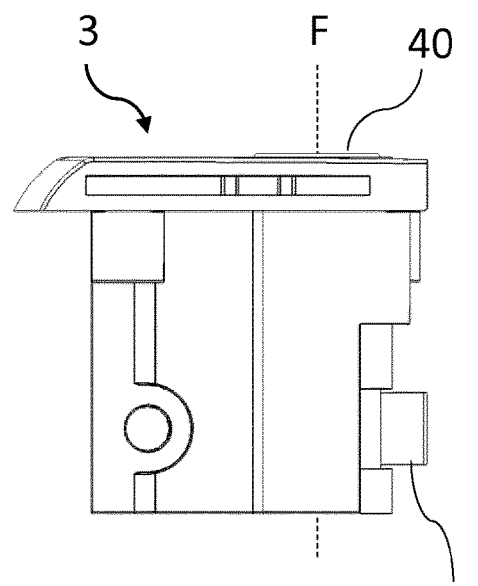
FIG. 14b is a side view of the locking device according to one embodiment of the present disclosure.

The locking device 3 of the handle arrangement according to one embodiment is depicted in FIGS. 14*a* and 14*b*. The locking device 3 is provided with an interacting portion 40 and an abutting element 39 rotatable around a sixth axis F. The abutting element is configured to rotatably press on the flange 36, causing the latching element to rotate around fifth axis E. In the embodiment of FIGS. 14*a, b*, the interacting portion 40 is a key lock cylinder.

FIG. 15*a* and FIG. 15*b* depict an assembly of an embodiment of the present invention comprising the locking device 3, the latching element 34, a housing abutting plate 43, and the handle 2. In FIG. 15*a*, the handle is in a closed position, as the latch 35 of the latching element 34 is engaged with the corresponding latch receiving element 7 of the handle. By interacting with the interacting portion 40 of the locking device, the abutting element 39 is presses onto the flange 36 causing the latching element to rotate around the fifth axis E such that the latch 35 disengages with the latch receiving portion 7 of the handle so that the handle may rotate around the first axis A as previously described.

Figure 16A:
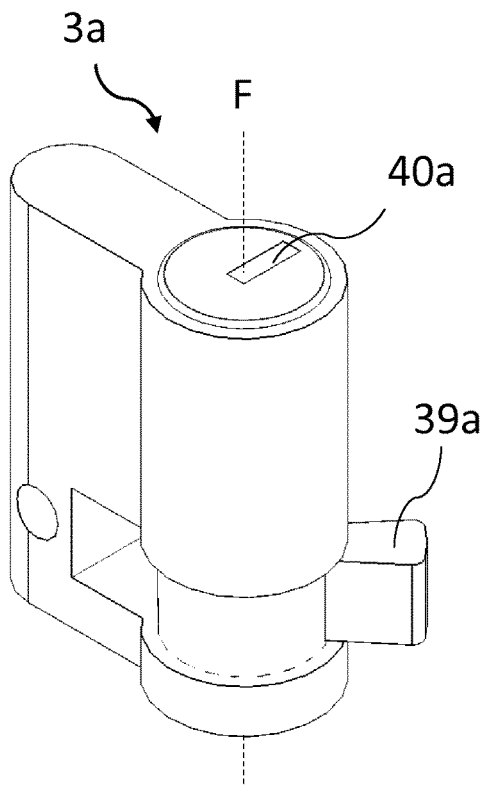
FIG. 16a, 17a, 18a, 19a are perspective view of different locking devices according to some embodiments of the present disclosure.
Figure 16B:
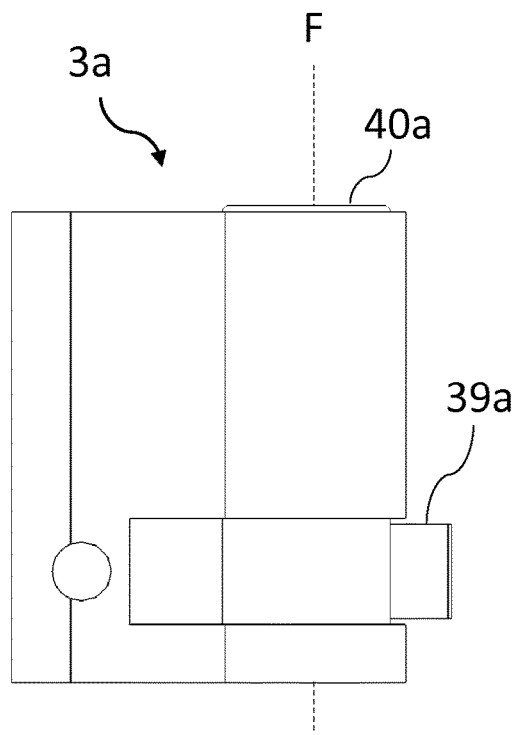
FIG. 16b, 17b, 18b, 19b are side views of different locking devices according to some embodiments of the present disclosure.

FIGS. 16*a-b*, 17*a-b*, 18*a-b*, and 19*a-b* depict different variants of the locking device 3, in a perspective view and a side view respectively. In FIGS. 16*a-b*, a cylinder lock 3*a* is illustrated. The cylinder lock 3*a* comprises an interacting portion 40*a* and an abutting element 39*a*. By inserting a key into the interacting portion 40*a* and twisting said key around the sixth axis F, the abutting element 39*a* is also rotated around the sixth axis F. When inserted into the handle arrangement 100, said twisting of the key inside the interacting portion 40 causes the abutting element 39*a* to abut and press onto the flange 36 of the latching element 34 of the handle arrangement. Hence, twisting said key inside the interacting portion 40 consequently disengages the latch 35 from the latch receiving portion 7 of the handle 2, thus allowing the handle 2 to be rotated from its closed position.

Figure 17A:
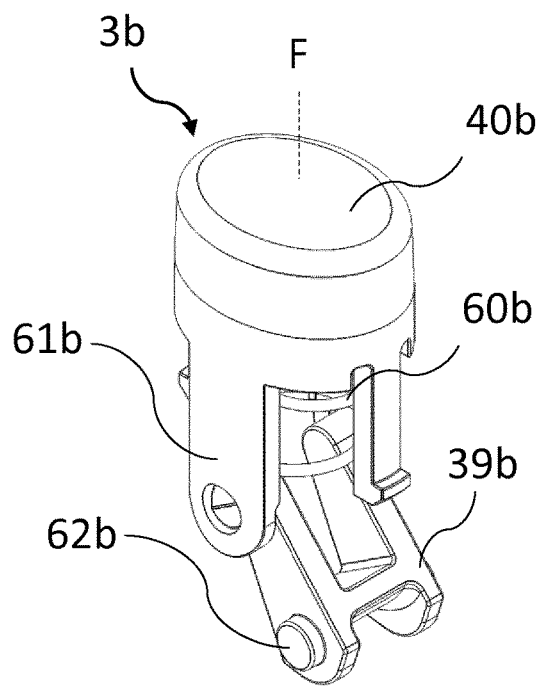
Figure 17B:
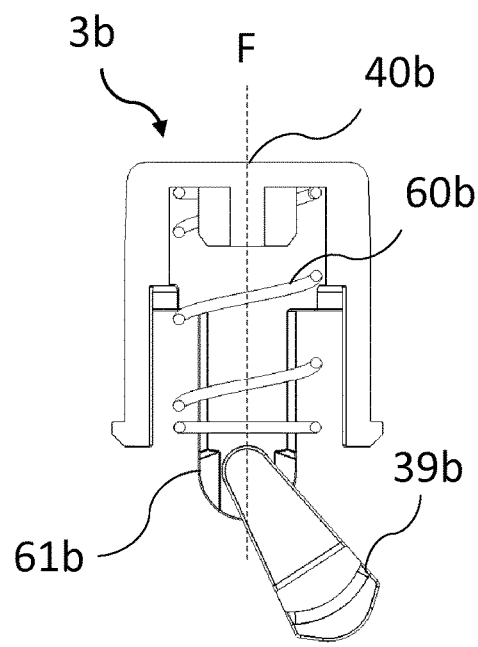

In FIGS. 17*a-b*, a different embodiment of the locking device 3 is illustrated. The locking device 3*b* comprise an interacting portion 40*b*, in this case a button, which is moveable along the sixth axis F. The locking device 3*b* further comprise an abutting element 39*b*, guiding flanges 61*b*, and a pre-biased spring 60*b* placed in a cavity of the button 40*b*. One longitudinal end of the spring is arranged such that it presses onto an interior surface of the button, said interior surface arranged perpendicular to the axis F. The opposite end of the pre-biased spring 60*b* is arranged to press onto a receiving plate fixed to the housing (not shown). The housing 1 further comprises guiding slots into which the guiding flanges 61*b* is configured to be placed. The housing also comprises guiding slots into which a set of guiding portions 62*b* on the abutting element 39*b* is inserted for guiding the movement of the abutting element 39*b* as the button 40*b* is pressed along the sixth axis F. When the button is pressed, the abutting element 39*b* is guided primarily in a direction perpendicular to the sixth axis F. When inserted into the handle arrangement 100, said pressing of the button 40*b* causes the abutting element 39*b* to abut and press onto the flange 36 of the latching element 34 of the handle arrangement 100. Hence, pressing said button along sixth axis F consequently disengages the latch 35 from the latch receiving portion 7 of the handle 2, thus allowing the handle 2 to be rotated from its closed position.

Figure 18A:
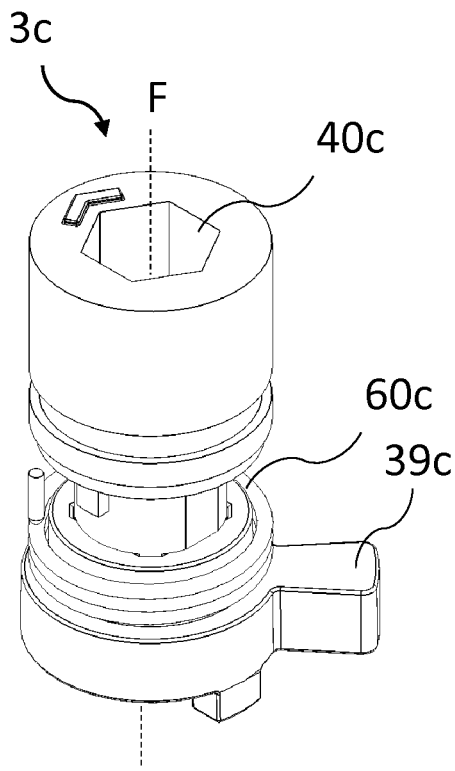
Figure 18B:
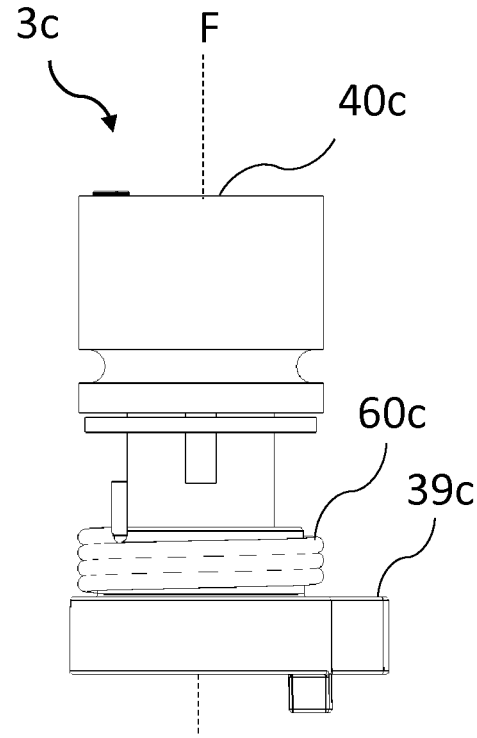
Figure 19A:
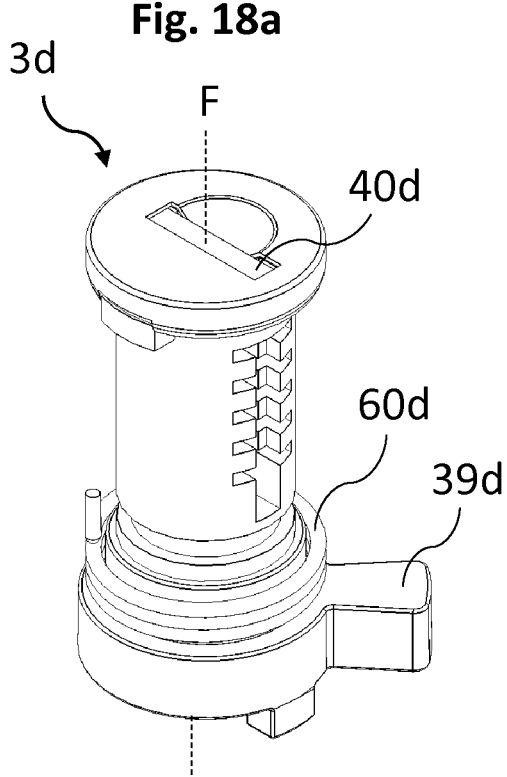
Figure 19B:
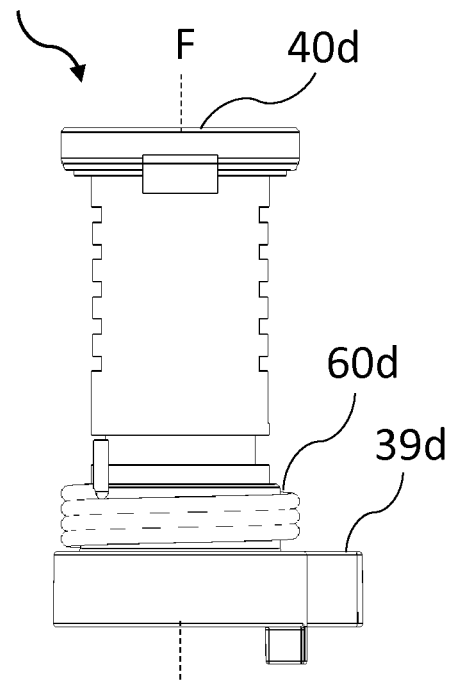

In FIGS. 18*a-b*, and in FIGS. 19*a-b*, two different embodiments of the locking device 3 are illustrated. The locking device 3*c*, 3*d* comprise an interaction 40*c*, 40*d*, an abutting element 39*c*, 39*d* and a spring 60*c*, 60*d*. The abutting element 39*c*, 39*d* are rotatable around a sixth axis F, the rotation induced by interacting with the interacting portion 40*c*, 40*d*. The spring 60*c*, 60*d* are arranged so that one longitudinal end abuts the housing and the opposite end abuts the abutting element 39*c*, 39*d*. When the abutting element 39*c*, 39*d* are rotated around the sixth axis F, the spring 60*c*, 60*d* become biased, thus exerting a torque onto the abutting element 39*c*, 39*d* to force it back into a resting position. When inserted into the handle arrangement 100, said rotation of the abutting element 39*c*, 39*d* causes the abutting element 39*c*, 39*d* to abut and press onto the flange 36 of the latching element 34 of the handle arrangement 100. Hence, said rotation consequently disengages the latch 35 from the latch receiving portion 7 of the handle 2, thus allowing the handle 2 to be rotated from its closed position.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A handle arrangement comprising:
   a housing, and
   a handle comprising a handle grip and a handle coupling portion, the handle rotatable relative to the housing around a first axis (A),
   wherein the handle further comprises
   a gear, the gear rotatable relative to said housing around a second axis (B), and
   a motion converter comprising a gear rack arranged adjacently to the gear, the motion converter gear rack being linearly moveable relative to the gear along a third axis (C) and comprises cut teeth configured to engage with corresponding cogs of the gear,
   wherein the motion converter is coupled to the handle such that a rotation of the handle around the first axis (A) causes the motion converter gear rack to move along the third axis (C) causing the gear to rotate around the second axis (B),
   wherein the motion converter is provided with a pre-biased spring configured to push an abutting element towards a recess in said handle, the recess configured to receive the abutting element such that the handle is kept in place in at least one position, and
   wherein the handle comprises an elongated slot configured to guide said motion converter such that the handle may be unsecured from a secured position to rotate into an intermediate position without translating said motion converter gear rack along the third axis (C).

2. The handle arrangement according to claim 1, wherein said first axis (A) and said second axis (B) are mutually perpendicular.

3. The handle arrangement according to claim 1, wherein said first axis (A) and said second axis (B) are mutually parallel.

4. The handle arrangement according to claim 1, wherein said third axis (C) is perpendicular to said first axis (A) and said second axis (B).

5. The handle arrangement according to claim 1, said motion converter comprises a linking element comprising two end portions wherein one end portion is rotatably coupled to said gear rack and the other end portion is rotatably coupled to said handle.

6. The handle arrangement according to claim 5, wherein said motion converter comprises an elongated slot guiding the motion of said abutting element when said handle is unsecured from said secured position to rotate into said intermediate position.

7. The handle arrangement according claim 1, wherein a contact interface between said abutting element and said handle is inclined relative to the direction of contact the abutting element makes with the handle.

8. The handle arrangement according to claim 1, wherein the cogs of said gear are distributed along a portion of the circumference of the gear on a motion converter gear rack facing side.

9. The handle arrangement according to claim 1, wherein said motion converter comprises a second gear rack arranged adjacently to said gear on the opposite side relative the first motion converter gear rack.

10. The handle arrangement according to claim 1, said handle arrangement comprising a spring placed in-between the gear and the housing.

11. The handle arrangement according to claim 1, said handle arrangement comprising a distance element placed in-between the gear and the housing.

12. The handle arrangement according to claim 1, said handle comprising a coupling recess arranged in-between the handle grip and the handle coupling portion, the coupling recess configured to receive a front facing edge of the housing when the handle is rotated into a maximally open position.

13. A method of releasing or securing a door comprising providing a handle arrangement of claim 1 in a door, the door comprising a latching mechanism having a latched position in which the door is secured to a door frame and an unlatched position in which the door in released, wherein said gear is coupled to the latching mechanism such that a rotation of the gear around said second axis moves the latching mechanism between the latched position and the unlatched position.

* * * * *